(12) United States Patent
Oostendorp et al.

(10) Patent No.: US 9,955,123 B2
(45) Date of Patent: Apr. 24, 2018

(54) MACHINE-VISION SYSTEM AND METHOD FOR REMOTE QUALITY INSPECTION OF A PRODUCT

(71) Applicant: Sight Machine, Inc., Ann Arbor, MI (US)

(72) Inventors: Nathan Oostendorp, Ann Arbor, MI (US); Kurtis Alan Demaagd, Grand Ledge, MI (US); Anthony Michael Oliver, Manchester, MI (US)

(73) Assignee: Sight Machine, Inc., San Francisco, CA (US)

( * ) Notice: Subject to any disclaimer, the term of this patent is extended or adjusted under 35 U.S.C. 154(b) by 169 days.

(21) Appl. No.: 13/783,107

(22) Filed: Mar. 1, 2013

(65) Prior Publication Data

US 2013/0229511 A1    Sep. 5, 2013

Related U.S. Application Data

(60) Provisional application No. 61/606,257, filed on Mar. 2, 2012.

(51) Int. Cl.
*H04N 7/18* (2006.01)
*G06T 7/00* (2017.01)

(52) U.S. Cl.
CPC .......... *H04N 7/181* (2013.01); *G06T 7/0004* (2013.01); *G06T 2207/10004* (2013.01); *G06T 2207/30164* (2013.01)

(58) Field of Classification Search
None
See application file for complete search history.

(56) References Cited

U.S. PATENT DOCUMENTS

| 5,835,627 A | 11/1998 | Higgins et al. |
| 6,795,200 B1 | 9/2004 | Barman et al. |
| 6,931,602 B1 | 8/2005 | Silver et al. |
| 7,305,449 B2 | 12/2007 | Simpson et al. |
| 7,383,536 B1 | 6/2008 | Petry, III et al. |
| 7,441,030 B1 | 10/2008 | Smith et al. |

(Continued)

FOREIGN PATENT DOCUMENTS

| CN | 1418352 A | 5/2003 |
| CN | 100529743 C | 8/2009 |

OTHER PUBLICATIONS

International Search Report and Written Opinion received for PCT Patent Application No. PCT/US2013/028752, dated May 9, 2013, 19 pages.

(Continued)

*Primary Examiner* — James M Anderson, II
(74) *Attorney, Agent, or Firm* — Dentons US LLP

(57) ABSTRACT

A machine-vision system for monitoring a quality metric for a product. The system includes a controller configured to receive a digital image from an image acquisition device. The controller is also configured to analyze the digital image using a first machine-vision algorithm to compute a measurement of the product. The system also includes a vision server connected to the controller, and configured to compute a quality metric and store the digital image and the measurement in a database storage. The system also includes a remote terminal connected to the vision server, and configured to display the digital image and the quality metric on the remote terminal.

15 Claims, 18 Drawing Sheets

(56) References Cited

U.S. PATENT DOCUMENTS

| | | | |
|---|---|---|---|
| 7,961,201 B1 | 6/2011 | Fix et al. | |
| 7,970,924 B2 | 6/2011 | Sarao et al. | |
| 7,986,953 B2 | 7/2011 | Rice et al. | |
| 8,090,592 B1 | 1/2012 | Goodall et al. | |
| 2001/0043358 A1 | 11/2001 | Schwartz | |
| 2001/0048760 A1* | 12/2001 | Bett et al. | 382/141 |
| 2002/0109112 A1 | 8/2002 | Guha et al. | |
| 2003/0011819 A1 | 1/2003 | Toda | |
| 2003/0122731 A1 | 7/2003 | Miyake | |
| 2004/0093100 A1 | 5/2004 | Gleis | |
| 2005/0157949 A1 | 7/2005 | Also et al. | |
| 2006/0072105 A1* | 4/2006 | Wagner | G01N 21/9503 356/237.1 |
| 2006/0091219 A1 | 5/2006 | Joseph et al. | |
| 2007/0009104 A1 | 1/2007 | Renkis | |
| 2007/0035781 A1 | 2/2007 | Maruyama | |
| 2008/0016119 A1* | 1/2008 | Sharma et al. | 707/104.1 |
| 2009/0268950 A1 | 10/2009 | Kuo | |
| 2010/0277774 A1 | 11/2010 | Reid et al. | |
| 2010/0304755 A1 | 12/2010 | Rice et al. | |
| 2012/0033716 A1 | 2/2012 | Hoang et al. | |
| 2012/0249577 A1 | 10/2012 | Sukenori | |
| 2013/0002609 A1 | 1/2013 | Lim et al. | |
| 2013/0054566 A1 | 2/2013 | Xu et al. | |
| 2013/0129372 A1 | 5/2013 | Manabe | |
| 2013/0132148 A1 | 5/2013 | Trummer et al. | |
| 2014/0180458 A1 | 6/2014 | Nayak et al. | |

OTHER PUBLICATIONS

Chiu et al., "Computer Vision on Tap", Massachusetts Institute of Technology. Media Laboratory, Cambridge, MA, 2009, 8 pages.

International Search Report & Written Opinion received for PCT Patent Application No. PCT/US2013/040215, dated Nov. 26, 2013, 13 pages.

Notice of Allowance received for U.S. Appl. No. 13/830,781, dated Sep. 30, 2014, 10 pages.

International Preliminary Report on Patentability received for PCT Patent Application No. PCT/US2013/028752, dated May 21, 2015, 18 pages.

Extended European Search Report (includes Supplementary European Search Report and Search Opinion) received for European Patent Application No. 13754852.5, dated Sep. 8, 2016, 12 pages.

Office Action Received for Canadian Patent Application No. 2,866,117, dated Feb. 3, 2017, 4 pages.

Office Action received for Canadian Patent Application No. 2,866,117, dated Jan. 13, 2016, 4 pages.

Office Action received for Chinese Patent Application No. 201380021796.2, dated Feb. 24, 2017, 22 pages (10 pages of English Translation and 12 pages of Official Copy.

Shi et al., "Smart Cameras: Fundamentals and Classification", Smart Cameras, Chapter 2, 2010, pp. 19-34.

"Vision Sensor FZ4 Series", Omron Corporation, 2011, pp. 1-42.

\* cited by examiner

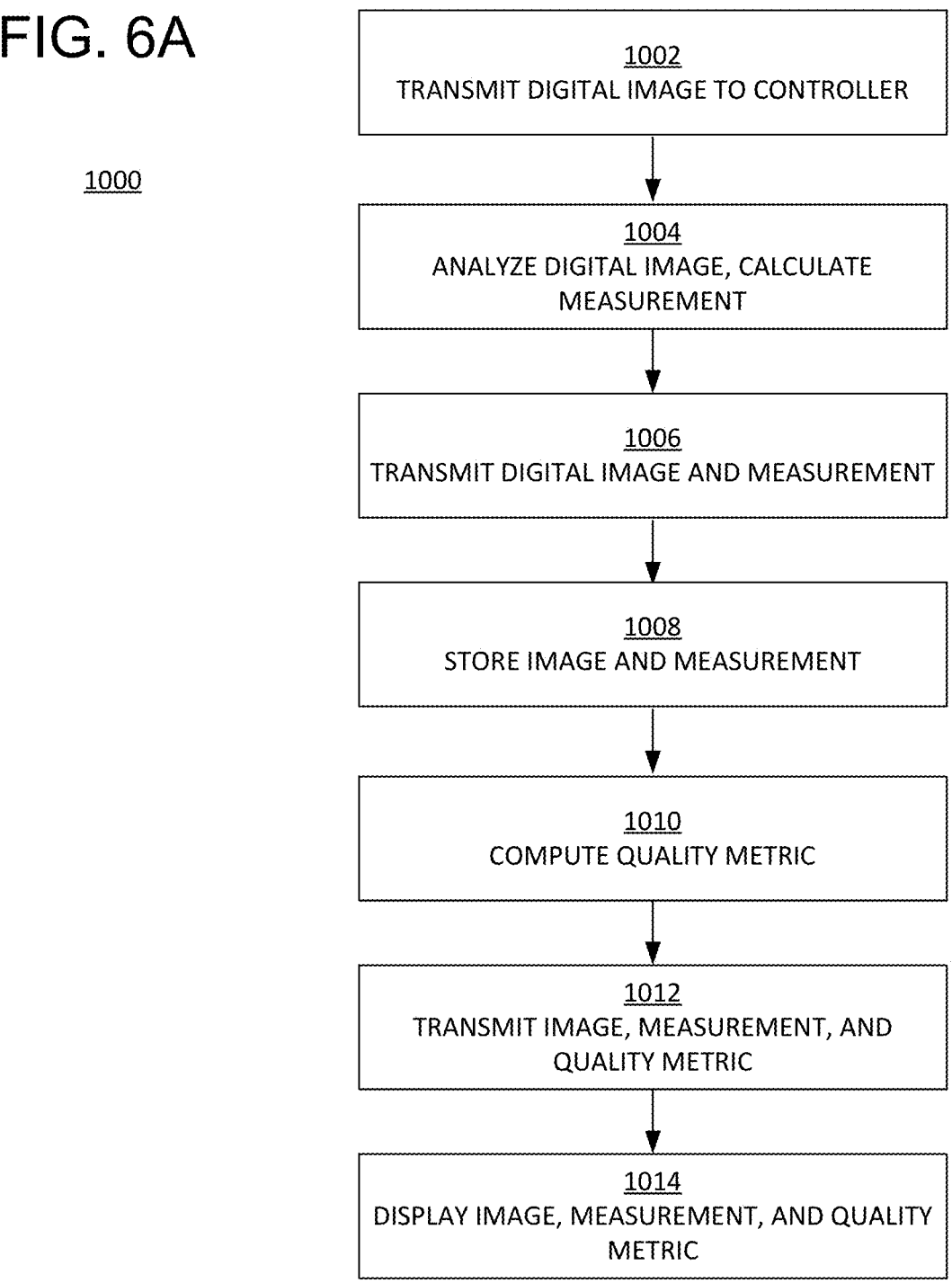

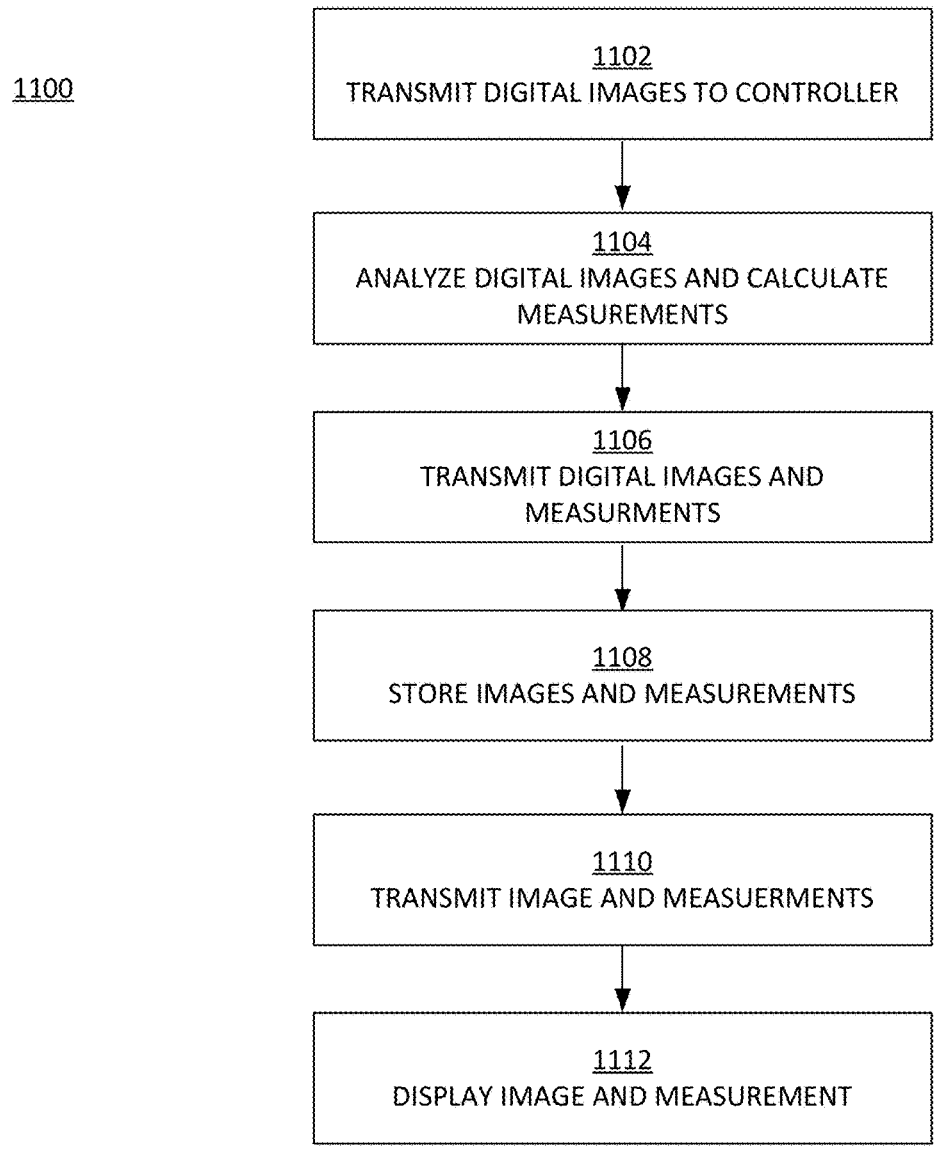

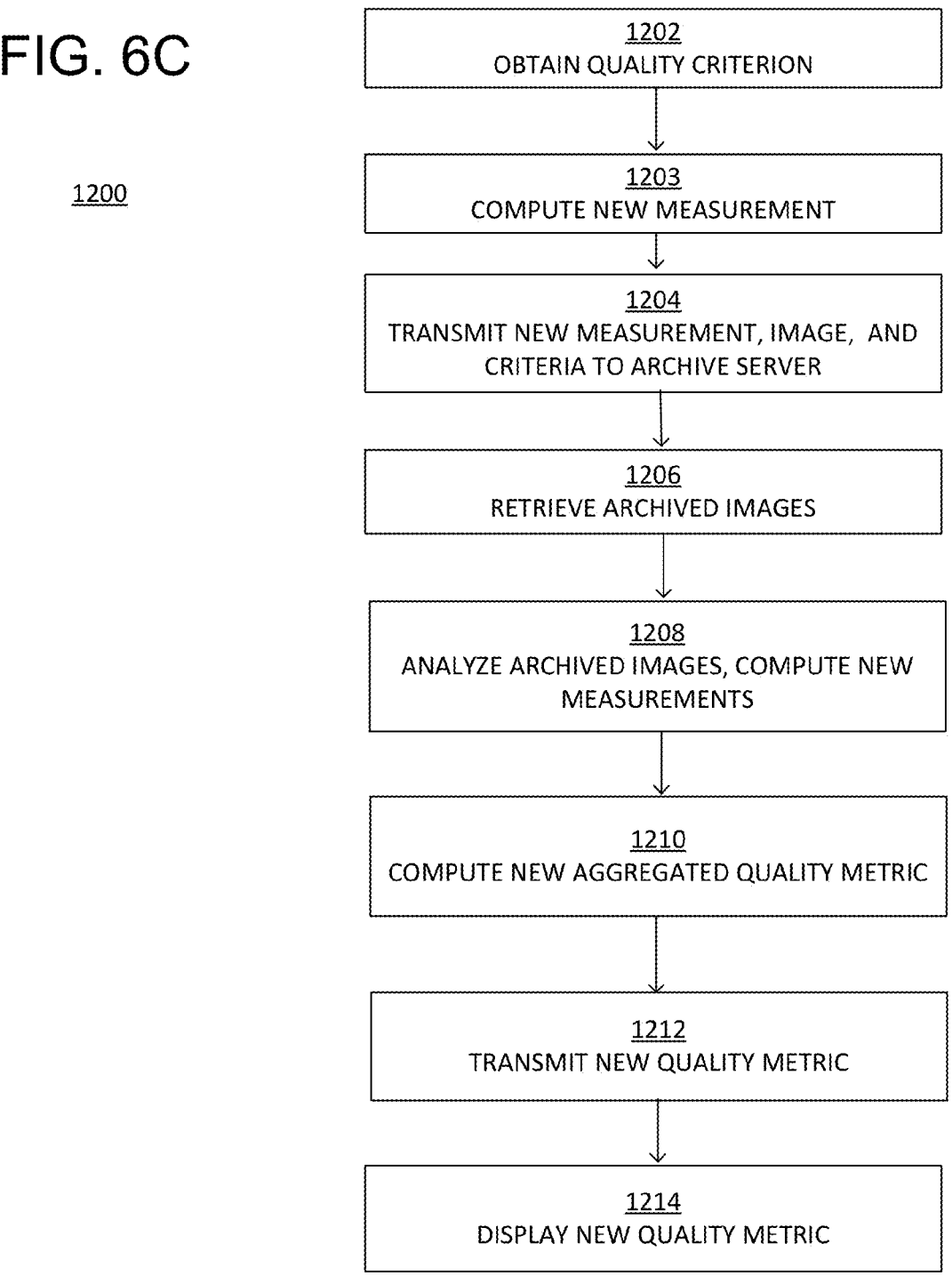

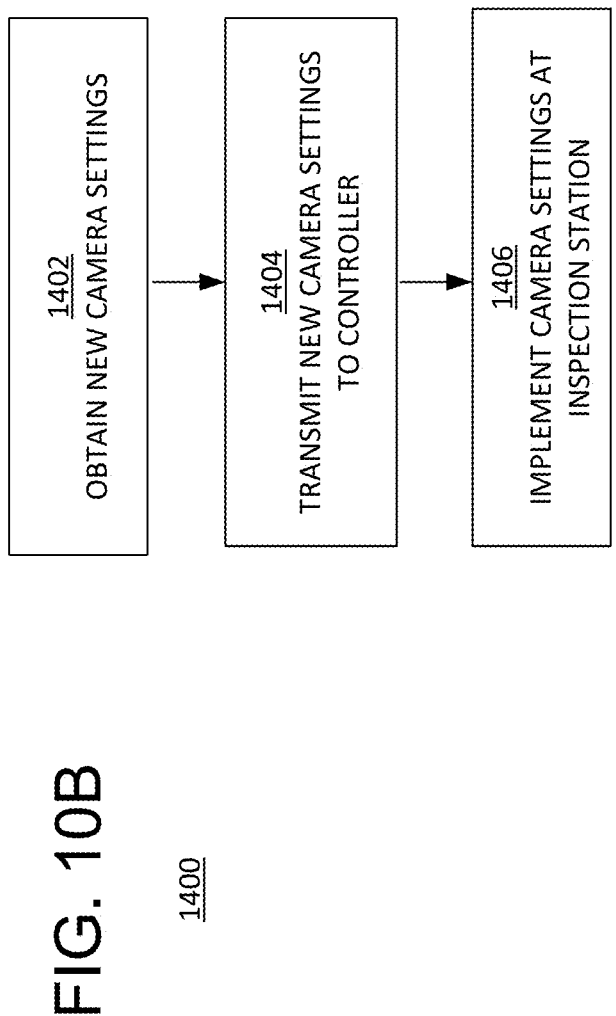

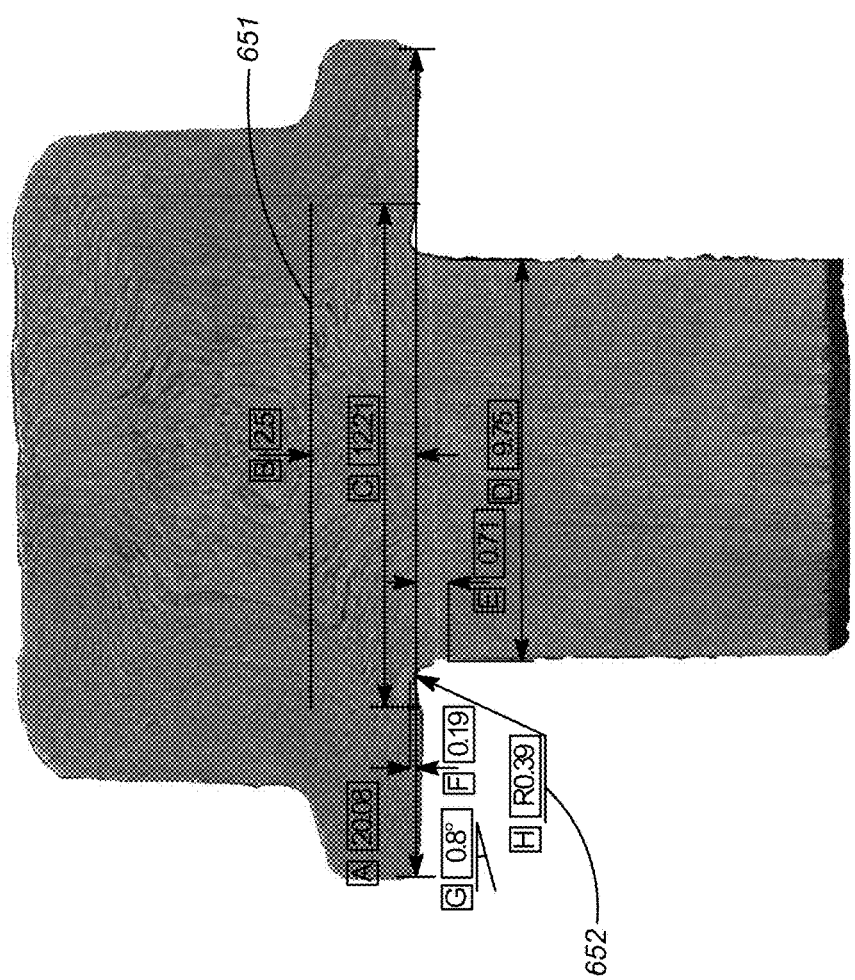

MACHINE-VISION SYSTEM AND METHOD FOR REMOTE QUALITY INSPECTION OF A PRODUCT

CROSS-REFERENCE TO RELATED APPLICATION

This application claims the benefit under 35 U.S.C. 119(e) of prior U.S. Provisional Patent Application No. 61/606,257, filed Mar. 2, 2012, which is hereby incorporated by reference in the present disclosure in its entirety.

BACKGROUND

1. Field

This application relates generally to the field of machine vision, and more specifically to a machine-vision system for remotely monitoring the quality of a product.

2. Description of Related Art

Quality inspection is a critical element of modern industrial automation systems. Typically, a quality inspection system involves the inspection and measurement of critical aspects of a product. Traditionally, a quality engineer or technician inspects a sample quantity of products in a production run and takes one or more measurements to determine a quality metric. If the quality metric satisfies a set of quality criteria, the production run is typically approved for shipment or sale. The effectiveness of the quality inspection system depends, in part, on the number of inspections that can be performed, the accuracy of the measurements taken, and skill of the quality engineer or technician.

In an effort to improve the effectiveness of a quality inspection system, machine vision can be used to monitor multiple inspection points using digital cameras placed throughout the manufacturing process. Machine vision may improve the reliability of a quality inspection system by increasing the number of inspections that can occur, providing precise measurements, and reducing the potential for human error.

In a typical machine-vision system, a digital image or video of a product may be acquired using a digital camera or sensor system. By analyzing the digital image or video, measurements for key features may be obtained and the product can be inspected for defects. A machine-vision system typically includes an image acquisition device (e.g., camera, scanner, or sensor) and a local processor for analyzing acquired digital images.

To monitor the quality of a product, multiple machine-vision systems are typically distributed throughout a production line or even across multiple production lines in different production facilities. Traditionally, each machine-vision system operates as an individual, autonomous cell in a production line and may only control a single aspect of the manufacturing process. That is, the output of a traditional machine-vision system may only provide binary output (pass/fail) in order to control an associated portion of the manufacturing process.

This autonomous-cell approach to machine vision has significant limitations. For example, using this approach, it may be difficult for a quality engineer or technician to monitor multiple machine-vision systems or to aggregate data from multiple inspection stations. Furthermore, current systems do not support remote access and control and may require that the quality engineer or technician be physically located near the inspection station to monitor or maintain the inspection operations. Thus, the configuration of each inspection station may not be easily updated resulting in non-uniformity across systems, making revision control difficult.

An additional drawback of current, autonomous-cell machine-vision is that it does not support cross-camera data sharing. Many facilities have multiple inspection stations located along a production line (or in multiple facilities), but the stations can only function as independent units—they are not capable of sharing data. The ability to share data may be especially important for complex manufacturing processes because it allows a more holistic approach to quality inspection.

Traditional autonomous-cell machine-vision systems have not been integrated as part of a more comprehensive quality inspection system due to significant technical challenges. For example, a typical machine-vision system using a high-resolution digital camera acquires and analyzes an immense amount of image data that may not be easily communicated or stored using traditional systems or techniques. Additionally, current automation systems do not readily provide for external access to or remote control of individual inspection stations.

The system and techniques described herein can be used to implement a machine-vision system for remote quality inspection of a product or system without many of the limitations of traditional systems discussed above.

BRIEF SUMMARY

One exemplary embodiment includes a machine-vision system for monitoring a quality metric for a product. The system includes a controller connected to an image acquisition device over a first data network. The controller is configured to receive a digital image from the image acquisition device over the first data network. The digital image represents at least a portion of the product. The controller is also configured to analyze the digital image using a first machine-vision algorithm to compute a measurement of the product, and transmit the digital image and the measurement over a second data network. The system also includes a vision server connected to the controller over the second network. The vision server is configured to receive the digital image and the measurement from the controller over the second data network, compute the quality metric based on an aggregation of the received measurement and previously computed measurements of other previously captured images, and store the digital image and the measurement in a database storage. The system also includes a remote terminal connected to the vision server over the second data network. The remote terminal is configured to receive the digital image and the quality metric from the vision server over the second data network, and display the digital image and the quality metric on the remote terminal. In some exemplary embodiments, the image acquisition device is a digital camera having a two-dimensional optical sensor array.

In some exemplary embodiments, the remote terminal is further configured to receive a request for a new quality criteria from a user at the remote terminal, and display a second measurement that corresponds to the new quality metric on the remote terminal. The vision server is further configured to analyze the received digital image using a second machine-vision algorithm to compute the second measurement of the product, and transmit the second measurement to the remote terminal for display. In some exemplary embodiments, the vision server is further configured to retrieve a plurality of previously stored digital images from the database in response to the request for the new quality criteria received at the remote terminal. The vision server is further configured to analyze the plurality of previously stored digital images using the second machine-vision algorithm to compute a plurality of second measurements corresponding to the plurality of previously stored digital images, compute a second quality metric based on an aggregation of the plurality of second measurements and the second measurement based on the received digital image, and transmit the second quality metric to the remote terminal for display.

In some exemplary embodiments, the vision server is further configured to compile the digital image and the quality metric as web content and transmit the web content to the remote terminal for display using an Internet browser.

In some exemplary embodiments, the remote terminal is further configured to display a graphical representation depicting the quality metric, wherein the graphical representation is updated in response to the archive server receiving a subsequent digital image and subsequent measurement of a subsequent product.

In some exemplary embodiments, the controller is configured to control the operations of a plurality of inspection stations, each inspection station having an image acquisition device. In some exemplary embodiments, the controller is further configured to receive signals from an automation controller indicating that the product is present and transmit an instruction to at least one inspection system of the plurality of inspection systems to capture the digital image.

In some exemplary embodiments, the remote terminal is further configured to receive a request for an updated machine-vision algorithm from a user. The vision server is further configured to receive the request from the remote terminal and transmit the updated machine-vision algorithm to the controller. The controller is further configured to analyze the received digital image using the updated machine-vision algorithm.

In some exemplary embodiments, the remote terminal is further configured to receive a request for an image acquisition setting from a user. The vision server is further configured to receive the request from the remote terminal and transmit the image acquisition setting to the controller. The controller is further configured to implement the image acquisition setting on the image acquisition device.

One exemplary embodiment includes a machine-vision system for monitoring the output of a plurality of inspection locations. The system comprises a controller connected to a plurality of image acquisition devices over a first data network. Each image acquisition device is configured to capture a digital image of a respective inspection location of the plurality of inspection locations to create a plurality of digital images. The controller is configured to receive the plurality digital images captured by the plurality of image acquisition devices over the first data network. The controller is also configured to compute a plurality of measurements by analyzing each digital image of the plurality of digital images using at least one machine-vision algorithm to compute at least one measurement for each digital image of the plurality of digital images. The controller may also be configured to compute a comprehensive measurement using the plurality of measurements; and transmit the plurality of digital images and the measurements and/or the comprehensive measurement over a second data network. The system also comprises a vision server connected to the controller over the second network. The vision server is configured to receive the plurality of digital images and the measurements and/or the comprehensive measurement from the controller, and store the plurality of digital images and the measurements and/or the comprehensive measurement in a database storage. The system also comprises a remote terminal connected to the vision server over the second network. The remote terminal is configured to receive at least one digital image of the plurality of images and the measurement and/or the comprehensive measurement. And display the at least one image and the measurement and/or the comprehensive measurement on the remote terminal.

DESCRIPTION OF THE FIGURES

FIGS. 6A-C depict exemplary processes for remote quality inspection of a product.

FIGS. 10A-B depict exemplary processes for control and maintenance of controller and inspection stations.

FIG. 12B depicts an exemplary analysis of the digital image captured at the inspection station.

DETAILED DESCRIPTION

Figure 1:
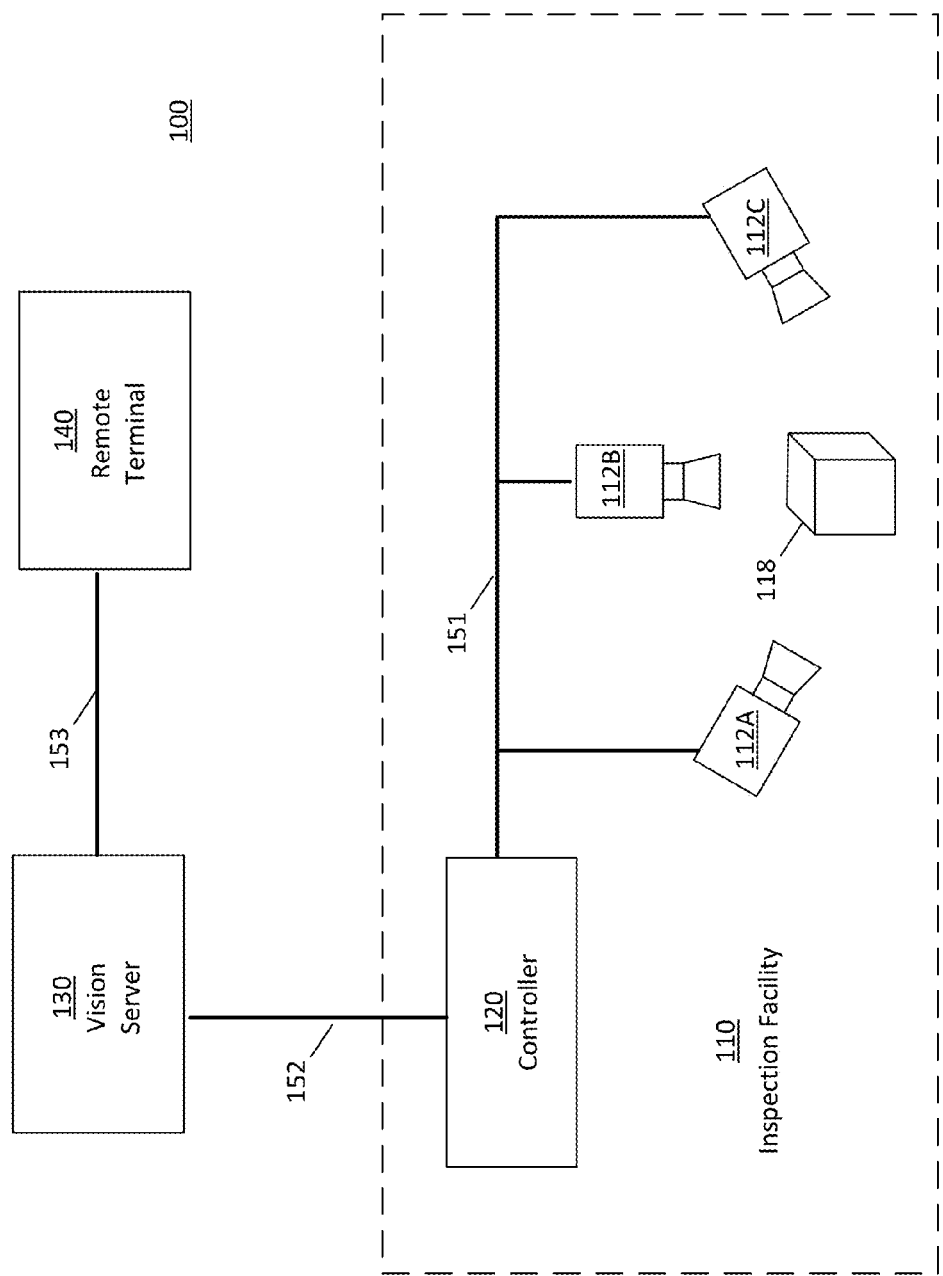
FIG. 1 depicts an exemplary system for remote inspection of a product.

Most manufacturing facilities employ some form of formal quality inspection designed to reduce product defects and costly product failures. Generally speaking, quality inspection includes the acquisition, measurement, and monitoring of key features of parts that may constitute some portion of a product. In small manufacturing facilities, quality inspection may be performed by a specially trained employee, such as a quality engineer or specialist, who inspects the parts at various stages of production. In larger facilities, human inspection is either impractical or impossible simply due to the number of inspections that are required.

As previously mentioned, machine vision is useful for inspecting parts or components of a product. For example, machine vision is typically implemented within an inspection station in a manufacturing line and is physically and electronically integrated with an automated production system. The automated production system is typically controlled locally by a programmable logic controller (PLC), computer system, or other electronic control device.

Traditional automation systems are typically streamlined to reliably execute a simple set of commands and manage the various logical states of the automation machinery. As a consequence, automation systems do not have the communication infrastructure or storage capacity to manage the large amount of data that is produced by a high resolution camera at one or more inspection stations.

Thus, as previously discussed, a traditional machine-vision inspection system operates as an individual autonomous cell in a manufacturing line and may only control a single aspect of the manufacturing process. To facilitate communication with the controller of the automated production system, the voluminous image data is typically reduced to one or more binary outputs (e.g., pass/fail, on/off). These types of binary outputs are particularly suitable for automation system control, which is designed for rapid and reliable operation.

However, because of the limited processing power and storage capacity of a typical automation system, nearly all of the image data that is acquired by the inspection station is immediately discarded after the reduced (binary) output is communicated to the main automation system. As a result, the amount of information that is available for analysis by the quality inspection system is inherently limited to the binary output and the operational statistics collected by the automation system, such as hours of runtime or number of line stoppages. Additionally, data captured in past images is often lost forever, preventing the quality engineer from re-analyzing products to troubleshoot a defect or failure.

Additionally, due to the use of proprietary software platforms at different inspection stations and the lack of a sufficient communication infrastructure, it is difficult if not impossible to directly compare data from multiple stations. As a result, a quality engineer or technician is forced to manually collect the limited data that is stored at the various inspection stations located throughout the production line or at multiple production lines at different facilities.

The use of proprietary software and the autonomous-cell approach to traditional machine vision also impairs the ability to perform software updates or manage revision control across a large system. Many times updating a traditional machine-vision system requires a local operator to physically load new software using a portable memory device, such as a thumb drive or computer disk. Therefore, upgrading software is traditionally a time-consuming and error-prone process.

The system and techniques described herein overcome many of the inherent limitations of traditional machine vision implementations and provide a more robust data gathering and collection tool for a quality inspection system.

1. Machine-Vision System for Remote Inspection of a Product

FIG. 1 depicts an exemplary machine-vision system for remotely monitoring the inspection of a product. In contrast to the traditional machine-vision implementations discussed above, the machine visions system 100 of FIG. 1 provides the ability to remotely monitor and control multiple inspection stations 112A-C from a single remote terminal 140 in near real time. Additionally, the machine-vision system 100 includes expandable storage capacity for large volumes of image data that can be retrieved for additional machine-vision processing.

As shown in FIG. 1, multiple inspections stations 112A-C are configured to view an exemplary product 118 at an inspection facility 110. Each inspection station 112A-C is configured to capture a digital image of at least a portion of the product 118 using an image acquisition device, such as a camera or imaging sensor.

Images captured by the inspection stations 112A-C are transmitted to the controller 120 over a data network 151. The controller implements one or more machine-vision algorithms on the captured images to extract one or more measurements of the product 118. The images and measurements are transmitted from the controller 120 to the vision server 130 over a data network 152 where they are stored in a database. The vision server 130 compiles images and measurements and transmits them over data network 153 for display on the remote terminal 140. In many implementations, the data networks 152 and 153 are the same data network.

Figure 2:
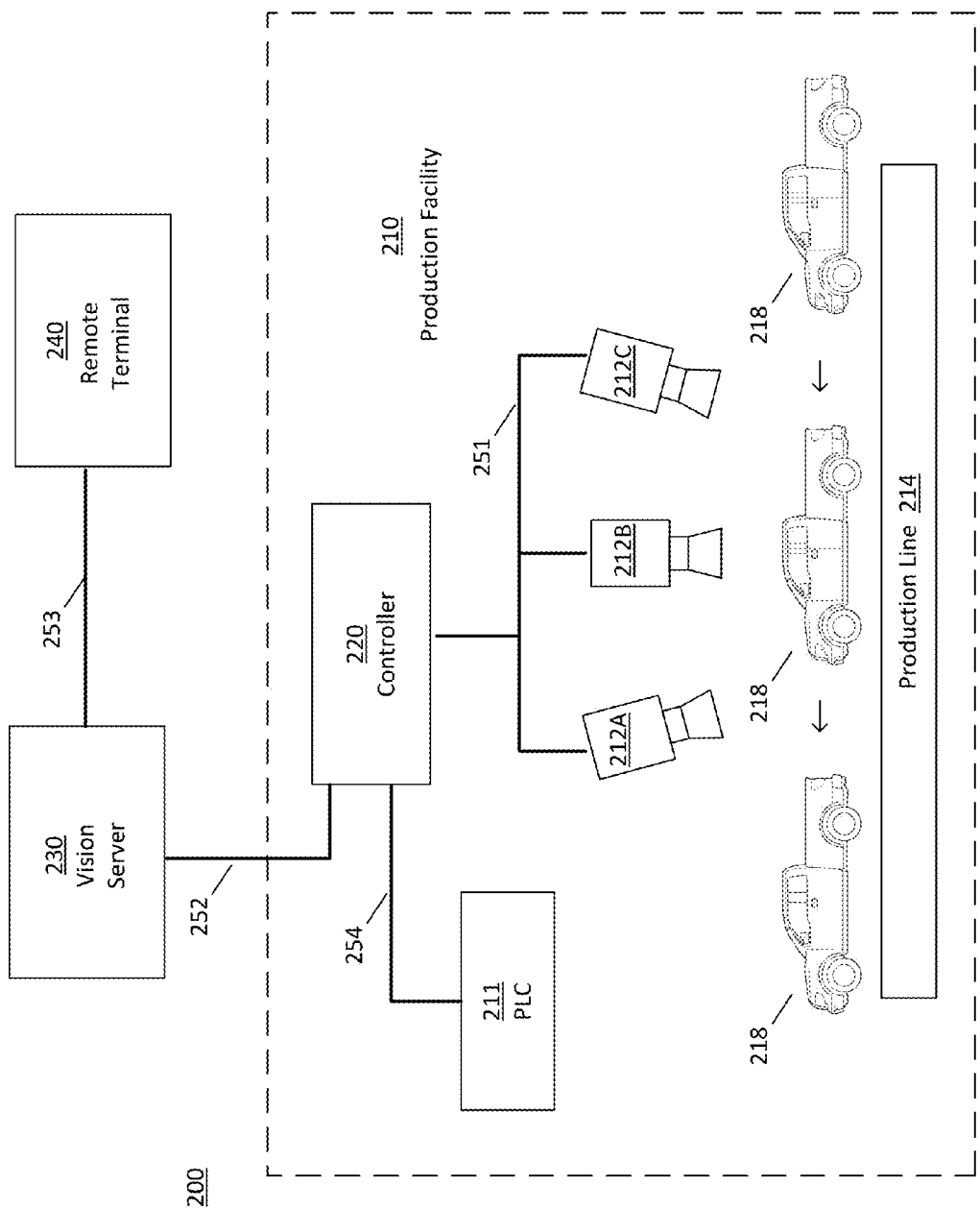
FIG. 2 depicts an exemplary system for remote quality inspection of a product.

FIG. 2 depicts an exemplary implementation of a machine-vision system for remotely monitoring the production quality of a product. The machine-vision system 200 depicted in FIG. 2 includes multiple digital-camera inspection stations 212A-C for monitoring the quality of a product being manufactured at a production facility 210. In this example, the product is a vehicle 218 near the final stages of production. As shown in FIG. 2, the vehicles progresses across the production line 214 from right to left.

In general, the machine-vision system 200 is used to verify that the product satisfies a quality criterion by computing a quality metric derived from information captured at one or more inspection stations 212A-C. In this example, the machine-vision system 200 is configured to inspect the type and placement location of multiple badges that are attached to the vehicle 218 using digital camera equipment. The production facility 210 produces a variety of vehicles that are equipped with different optional equipment. A particular combination of optional equipment, also referred to as a trim level, receives a different set of vehicle badges. In some cases, vehicles having different trim levels are manufactured consecutively in the production line 214. In some cases, due to operator error, the vehicle badge that is installed does not correspond to the trim level. If the vehicle is shipped to the dealer with the wrong badge, it may cost the manufacturer several hundred dollars to return the vehicle to the production facility to correct the defect. As described in more detail below, the system can be configured to verify that the correct vehicle badge is installed and that the placement of the vehicle badges is within predetermined tolerances.

In this example, the portion of the production line that is depicted in FIG. 2 is controlled by an automation system. The automation system includes a PLC 211 for coordinating the operations performed at various stages in the production line 214. In general, the PLC 211 dictates the timing and rate of production of the production line 214. The PLC 211 is typically part of an existing automation system and interfaces with the various devices in the production facility 210 using a data network 254 or dedicated communication conduit.

As shown in FIG. 2, multiple inspection stations 112A-C are configured to capture images of a different portion of the vehicle 218 that is being manufactured. Described in more detail below with respect to FIG. 4, each inspection station 212A, 212B, and 212C includes a digital camera and image acquisition software adapted to capture and transmit image data to controller 220 over a data network 251. The data network 251 is typically an industrial protocol network such as OPC, Modbus, ProfiNet, and the like.

Figure 4:
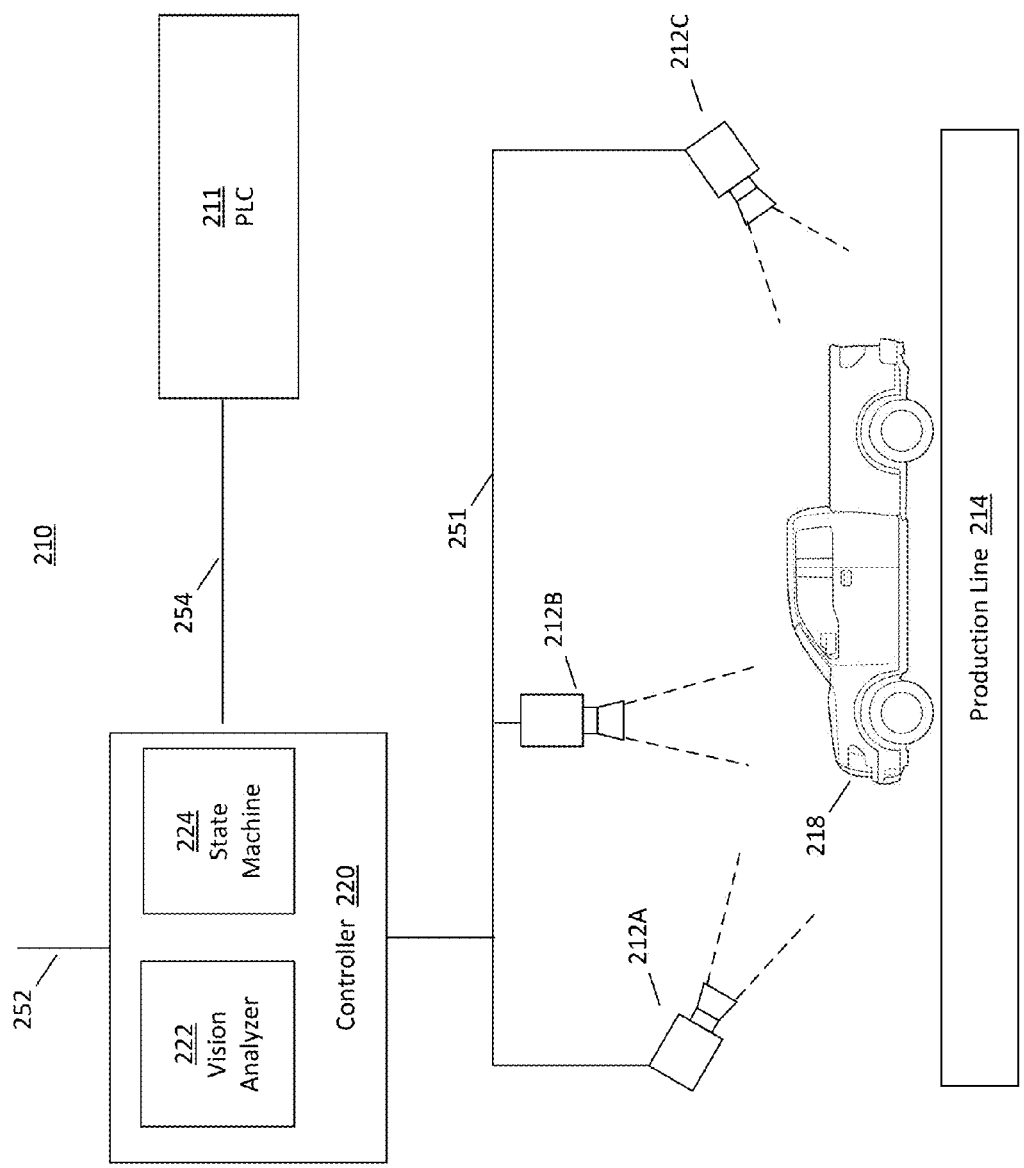
FIG. 4 depicts the portion of the exemplary system that is located at the production facility.

The controller 220 serves multiple functions in the machine-vision system 200, as described in more detail with respect to FIG. 4. Generally, the controller 220 (1) interfaces with the automation system to operate multiple inspection stations; (2) collects digital images from the inspection stations 212A-C; (3) performs machine vision analysis on the collected digital images to obtain measurements; and (4) transmits the digital image and measurements to vision server 230. Although the machine-vision system 200 depicts a single controller 220 located at the production facility 210, more than one controller could be used in the same production facility 210 or multiple controllers could be used at different production facilities.

As shown in FIG. 2, the machine-vision system 200 extends beyond the production facility 210. In this example, machine-vision system 200 includes a vision server 230 connected to the controller 220 by a data network 252. The digital images and measurements collected at the controller 220 are communicated over the data network 252 to the vision server 230. The data network 252 used for the communication typically includes either a Local Area Network (LAN) or a Wide Area Network (WAN) using a TCP/IP or other Internet communication protocol.

Figure 5:
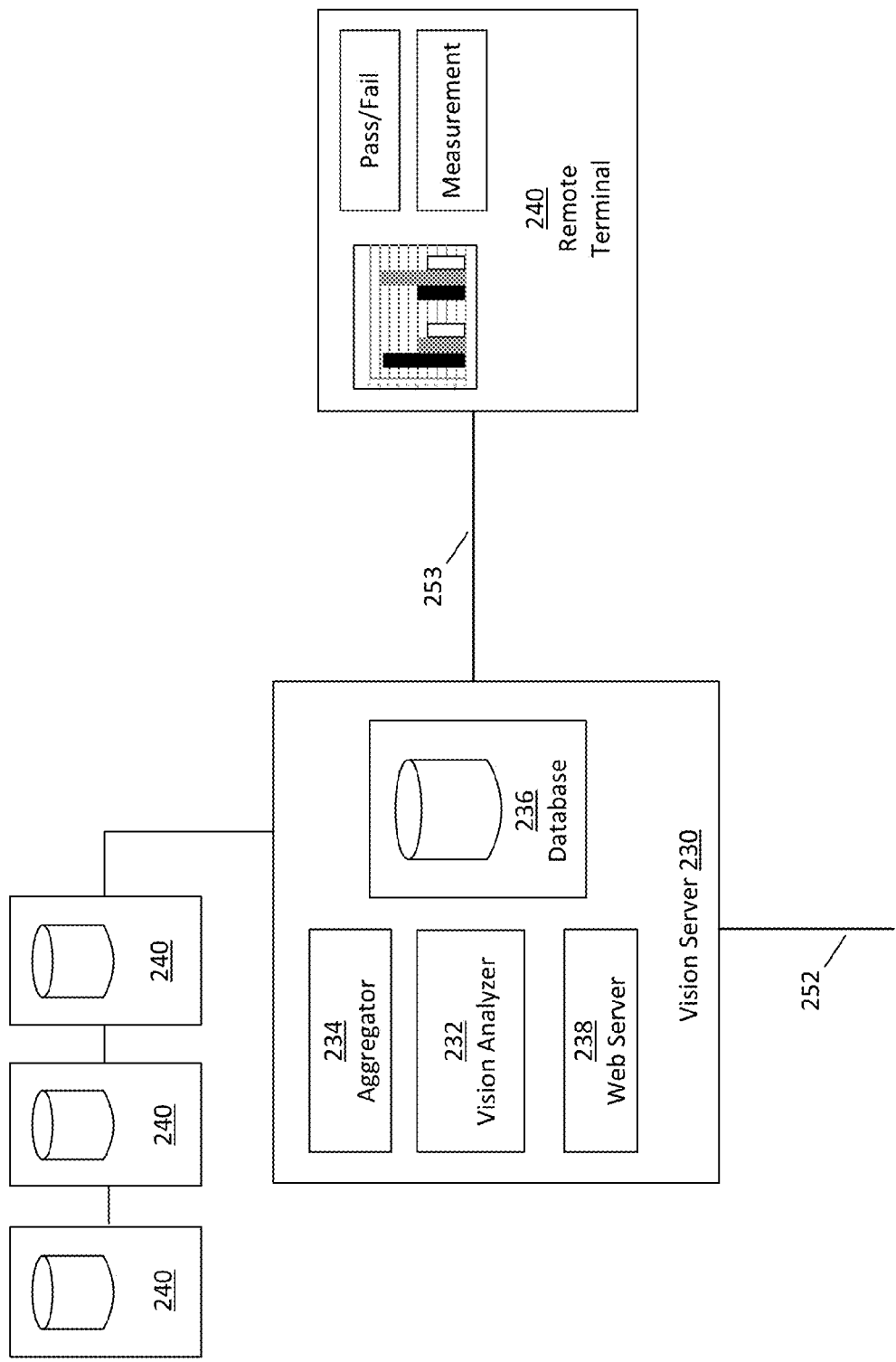
FIG. 5 depicts the portion of the exemplary system that is located external to the production facility.

The vision server 220 also serves multiple functions in the machine-vision system 200, as described in more detail with respect to FIG. 5. First, the vision server 230 serves as a data collection and archival tool for the system. Specifically, the vision server 230 stores the digital images and measurements received by the controller 220 over data network 252. Each digital image and its associated measurements are also referred to as a data frame, and may be archived in the vision server 230 for long-term storage and/or for retrieval for further analysis.

Second, the vision server 230 functions as a tool for performing secondary analysis on the digital images and measurements. For example, as described with respect to FIG. 5, below, the vision server 230 includes an aggregator 234 that computes a quality metric based on a current measurement received from the controller 220 and other measurements that were previously received. The vision server 230 can also perform additional machine vision analysis on digital images that are being received along with archived digital images to obtain new measurements that may be specified by the user. This is an important aspect of the machine-vision system 200 which, as described in more detail below, can be configured to dynamically update the quality metrics or measurements that are being monitored and archived.

Third, the vision server 230 provides output to the remote terminal 240, where the results of the inspection and analysis can be visualized through a user interface. As shown in FIG. 2, the vision server 230 is connected to a remote terminal 240 through data network 253. The data network 253 includes either a Local Area Network (LAN) or a Wide Area Network (WAN) using a TCP/IP or other Internet communication protocol, as described above with respect to data network 252. In many cases, the data network 252 and data network 253 are the same WAN computer network (e.g., the Internet).

Digital images collected by and stored on the vision server 230 may be communicated to and displayed on the remote terminal 240. Additionally, collected measurements and quality metrics may also be communicated to and displayed on the remote terminal 240. As described in more detail below with respect to FIGS. 9A-B and 10, the information communicated to the remote terminal 240 may be visualized using a specialized user interface that can be adapted to provide a visual indicator of the quality of the products.

Figure 3:
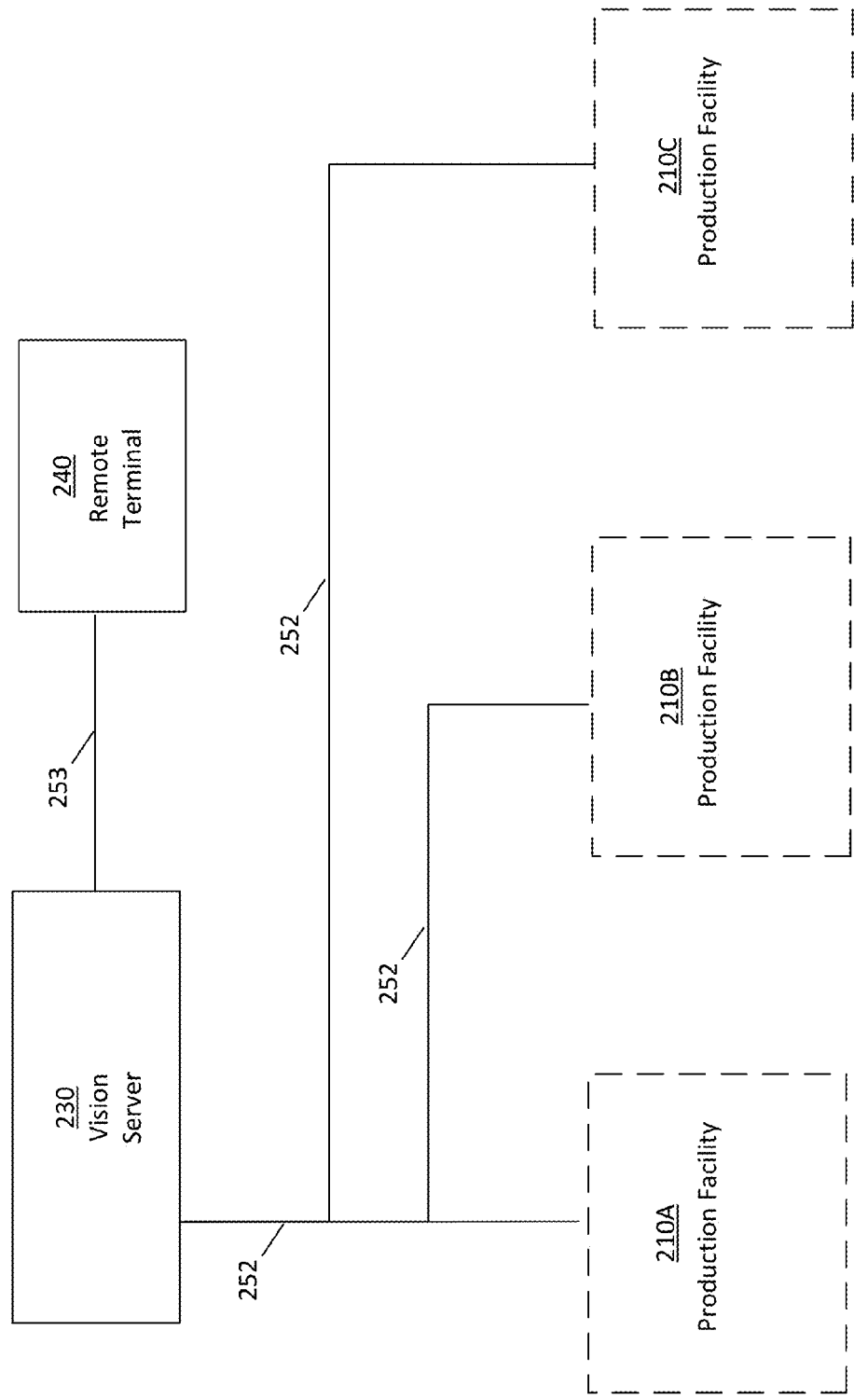
FIG. 3 depicts an exemplary system for monitoring multiple production facilities.

The remote terminal 240 is typically operated by a quality engineer or technician. Through the user interface of the remote terminal 240, the quality engineer or technician can remotely monitor various aspects of all of the inspection stations 212A-C at the production facility 210. Additionally, machine-vision system 200 can be configured to integrate the output from other inspection stations located at other production lines in other production facilities. FIG. 3 depicts an exemplary configuration with a remote terminal 240 and vision server 230 connected to multiple production facilities 210A, 210B, and 210C, using data network 252.

The machine-vision system 200, as shown in FIGS. 1-4, offers multiple advantages over prior art systems. First, the machine-vision system 200 provides updated quality metrics for display on the remote terminal 240 in near real time. That is, in some implementations, as new measurement data is provided to the vision server 230, the data metric is recalculated by the aggregator 234 (shown in FIG. 5) and an updated data metric is communicated to the remote terminal 240. Using machine-vision system 200, the operator can monitor inspections nearly simultaneously with their occurrence at multiple inspection stations 212A-C in the production facility 210. A more detailed discussion of this technique is provided below with respect to FIG. 6A.

Second, the machine-vision system 200, as shown in FIGS. 1-4, provides systematic storage and archiving of captured digital images and measurement data using the database 236 located at the vision server 230. The large volume of data that can be stored on the database 236 allows the operator to review previous production runs and even perform additional machine-vision analysis on stored digital images to extract new measurements. This functionality may be useful when troubleshooting a product failure mode that may have been passed through the system using the original quality criteria. A more detailed discussion of this technique is provided below with respect to FIG. 6B.

Third, the machine-vision system 200, as shown in FIGS. 1-4, provides dynamically updatable analytics. In one example, the user may specify new quality criteria via the user interface at the remote terminal 240 as production is occurring on the production line 214. In response to the new quality criteria, a (second) vision analyzer 232 located at the vision server 230 may perform a secondary analysis on digital images received by the vision server 230 to calculate a new measurement. The second vision analyzer 232 may also perform the same secondary analysis on digital images stored in the database 236 to calculate new measurements for inspections that have occurred in the past. The aggregator 234 computes a new quality metric that corresponds to the new quality criteria using both: (1) the new measurement computed based on the received digital image, and (2) new measurements based on digital images stored in the database 236. A more detailed discussion of this technique is provided below with respect to FIG. 6C.

As described below, the machine vision system 200 can be split into portions located at the production facility 210 and portions that are located outside of the production facility 210. However, in some implementations, the vision server 230 or the entire machine-vision system 200 may be located inside the production facility 210. In other implementations, the controller 220 or the entire machine-vision system 200 may be located outside the production facility 210.

a. On-Site Portions of the Machine-Vision System

FIG. 4 depicts the portion of machine-vision system 200 located at the production facility 210. As shown in FIG. 4, the depicted portion of the production line 214 includes multiple inspection stations 212A-C. Each inspection station is configured to capture a digital image of a different portion of the vehicle 218 being manufactured. As discussed above, the inspection stations 212A-C are configured to detect the type and placement location of multiple vehicle badges in an automated production line 214.

Each of the inspection stations 212A-C includes a digital camera and image acquisition software adapted to capture a digital image of the portion of the vehicle 218. In this example, the digital camera includes a CCD digital sensor and optical components (lenses, lighting, etc.) for producing an optical image of the portion of the vehicle 218 on the digital sensor surface. When triggered by an external signal, a single image or video image sequence is captured be the digital camera and temporarily stored in local computer memory. While a digital camera is particularly suitable in this scenario, other types of image acquisition devices, including infrared sensors, flat-bed scanners, optical arrays, laser scanners, and the like could be used to capture a digital image. In this example, a digital image includes a multi-dimensional array of values that correspond to the optical input of the digital camera sensor. Depending on the type of image acquisition device, a digital image may also include any bitmap array of data values. It is not necessary that the digital image referred to herein includes data that is readily able to be visualized as a picture image.

As discussed above, the digital image captured by one of the inspection stations 212A, 212B, or 212C is transmitted to controller 220 over a first data network 251. The first data network 251 is typically an industrial protocol network, such as OPC, Modbus, ProfiNet, and the like. The first data network may also be a dedicated conduit communication, such as a universal serial bus (USB), IEEE 802 (Ethernet), IEEE 1394 (FireWire), or other high speed data communication standard.

The controller 220 depicted in FIGS. 2 and 4 is typically a dedicated computer system having a computer processor and non-transitory computer readable memory for storing computer instructions for performing the functions described below. In many cases, the controller 220 is an industrial-grade computer system configured to operate for extended periods of time without shutting down or being rebooted. In some cases, the controller 220 includes one or more specialized digital signal processors (DSP) for analyzing large quantities of digital image data.

As previously mentioned, the controller 220 serves multiple functions in the machine-vision system 200. First, the controller 220 interfaces with the automation system to operate multiple inspection stations. As shown in FIG. 4, the automation system typically includes a PLC 211 for coordinating input from sensors and devices in the production line 214 and controlling the timing of the operations performed at various stations. In this example, the PLC 211 receives input from one or more proximity sensors that indicate that the vehicle 218 has arrived at the corresponding inspection station 212A, 212B, or 212C. In response to detecting the vehicle 218, the PLC 211 sends a signal to the controller 220 using data network or dedicated communication conduit 254. The data network connection may be an industrial protocol network as described above with respect to data network 251. Alternatively, the controller may be connected to the PLC 211 by a dedicated conduit, including, for example, a pair of wires connected to an output terminal of the PLC 211.

A second function of the controller 220 is to collect digital images from the inspection stations 212A-C. In this example, the portion of the controller 220 that controls the inspection stations 212A-C is configured to operate as a logical state machine. In one example, the state machine 224 of the controller 220 is configured to be in one of multiple logical states. A first logical state may be, for example, "waiting for vehicle." In response to a signal or message from the PLC 211 indicating that a vehicle 218 has arrived, the state machine 224 on the controller 220 may transition to a "capture image" state. In this logical state, the state machine 224 causes the controller 220 to send a signal or message to one or more of the inspection stations 212A, 212B, or 212C instructing it to capture a digital image. The state machine 224 then enters a "waiting for image" state until the digital image is transmitted from one of the inspection stations 212A, 212B, or 212C to the controller 220 over the data network 251.

Other logical states of the state machine 224 on the controller 220 may be, for example, "image received," "inspection station ready," "image stored," or "inspection station error." For any one state, an instruction or message may be generated on data networks 251, 254, or another operation initiated on the controller 220. The simplicity and reliability of a logical state machine configuration is particularly well suited for systems integrated with an automation system. However, other logical-control configurations may also be used to collect digital images from the inspection stations 212A-C.

A third function of the controller 220 is to perform analysis on the collected digital images to obtain measurements. In this example, the controller 220 includes a vision analyzer 222 for analyzing digital images captured by the inspection stations 212A-C. A more detailed description of types of analysis performed by the vision analyzer 222 is discussed below with respect to FIGS. 6A-C, 8, 12A-B, and 13. In general, the vision analysis includes the execution of one or more machine-vision algorithms, which apply one or more heuristics to the pixel data of the digital image. Exemplary machine-vision algorithms include, for example, thresholding, image segmentation, blob discovery, edge detection, filtering, and the like. Other analysis tools include shape and character recognition algorithms. The machine-vision algorithms may be implemented using a library of image-processing commands and/or a structured processing language. For example, a Vision Query Language (VQL) may be used to process the digital image in a series of image-processing operations. Other analysis tools include shape and character recognition algorithms that can be used to obtain a shape or text string feature. In many cases, the result of an initial vision analysis identifies one or more features in the digital image, including, for example, a line, edge, shape, blob, or the like. The obtained features are typically further analyzed to obtain one or more measurements, such as width, height, location, number of blobs, or the like. In the case of shape or image recognition, the measurement may be a simple "match" or "no match."

A fourth function of the controller 220 is to transmit the digital image and measurements to the vision server 230 (depicted in FIGS. 2 and 5). As previously discussed, the controller 220 is connected to the vision server 230 by data network 252. In this example, the data network 252 is an Internet communication protocol. The digital image and measurements may be transmitted together as a data frame. Other information may also be included in the data frame, such as time, date, location, camera settings, part number, or any other information associated with the inspection of the vehicle 218.

In a typical implementation, the vehicles 218 are produced at a regular cycle rate, also referred to as the production cycle. As a result, the inspection stations 212A-C must operate within the timing requirements of the production cycle. The controller 220 is connected to the PLC 211 of automation system and can receive information about the location of the vehicles 218 and the state of the production line 214 directly from the PLC 211. Thus, the controller 220 is able to control the operation of each inspection station 212A, 212B, or 212C in accordance with the timing of the overall production line 214.

In the current implementation, the controller 220 can also be used to control settings at the inspection stations 212A-C. Settings may include light settings, aperture, shutter speed, ISO, timing, image resolution, and the like. The controller 220 can also be used to aggregate information from other sensors at other locations along the production line 214. The information about other sensors is typically communicated to the controller 220 from the PLC 211 via data network 254.

b. Off-Site Portions of the Machine-Vision System

FIG. 5 depicts the portion of the machine-vision system 200 that is located external to the production facility 210. As previously mentioned, machine-vision system 200 includes a vision server 230 connected to the controller 220 by a data network 252, which includes either a Local Area Network (LAN) or a Wide Area Network (WAN) using a TCP/IP or other Internet communication protocol.

The vision server 220 typically includes a server-type computer system having at least one computer processor and non-transitory computer readable memory for storing computer instructions for performing the functions described below.

As described above with respect to FIG. 2, the vision server 230 functions as a data collection and archival tool for the machine-vision system 200. As depicted in FIG. 5, vision server 230 includes a database 236 for storing digital images and associated measurements. The database 236 is configured for high-volume data storage in order to provide an archive of high-resolution image data over an extended period of time. The vision server 230 may include several hard drive components to provide several terabytes of storage capacity. The vision server 230 may also utilize multiple other server machines 240 to scale the storage capacity and processing capabilities, as required by the machine-vision system 200. In many cases, the vision server 230 and other server machines 240 are configured to provide scalable storage capacity sufficient to operate using multiple controllers located in various production facilities.

In this example, the vision server 230 stores digital images and associated measurements received from the controller 220 as a data frame. The database 236 is configured to store the data frames received by the controller 220 in groups organized by manufactured product, production run, production date, or the like. The database may also build an index using the measurement data to facilitate rapid retrieval of stored data.

Another function of the vision server 230 is to provide additional analysis based on a digital image and measurements that are received from the controller 220. As depicted in FIG. 5, the vision server includes an aggregator 234. Measurements that are received by the vision server 230 are collected by the aggregator 234 and are used for further analysis by the machine-vision system 200. In the present example, the aggregator 234 computes at least one quality metric using the collected measurements. Quality metrics computed by the aggregator 234 include, for example, a mean value and standard deviation calculated based on a current measurement received from the controller 220 and other measurements that were previously received from the controller 220. Other quality metrics include, without limitation, pass, fail, deviation from mean, average measurement, mean measurement, rejection rate, total number of failures, and others. The quality metric may include results generated by statistical processing including, for example, regression analysis, distribution analysis, or Nelson rules of process control and other control charting techniques.

As depicted in FIG. 5, the vision server 230 also includes a (second) vision analyzer 232 for performing additional vision analysis on digital images that have been captured by the inspection stations 214. In one example, the vision analyzer 232 performs additional analysis on currently received digital images and on digital images that are stored in the database 236 to compute a new quality metric. In some cases, the vision server 230 uses the vision analyzer 232 to produce additional measurements that are delivered to the aggregator 234 to compute a new quality metric.

Another function of the vision server 230 is to provide output to a remote terminal 240 through data network 253. Digital images, measurements, and quality metrics collected by and stored on the vision server 230 may be communicated to and displayed on the remote terminal 240. As depicted in FIG. 5, the vision server 230 includes a web server 238 to provide the data to the remote terminal 240 using one or more web-based protocols. The web-based protocol(s) may support the transfer of the data using technologies such as HTML, JavaScript, and/or JSON such that the remote terminal 240 can display visualizations of the data through a user interface, and update those visualizations as new data is computed by the vision server 230. Examples of the types of user interfaces that may be displayed on the remote terminal 240 are provided below with respect to FIGS. 9A-B and 13.

2. Exemplary Processes for Performing Machine Vision Analysis

FIGS. 6A-C depict exemplary processes for performing machine vision analysis using a machine-vision system 200, as depicted in FIG. 2. For the purposes of the following discussion, the machine-vision system 200 is configured to monitor quality metrics related to the placement of a vehicle badge on a vehicle. However, the following processes could be more generally applied to monitor quality metrics associated with a variety of products or processes, as described with respect to the examples depicted in FIGS. 12A-B and 13.

FIG. 6A depicts an exemplary process 1000 for monitoring a quality metric for a product using the machine-vision system 200 depicted in FIG. 2. For the purposes of the following discussion, quality metrics related to the placement of a vehicle badge are monitored at remote terminal 240.

With reference to FIG. 4, a vehicle 118 is located at an inspection station 112A, 112B, or 112C. A digital image of a portion of the vehicle 118 is captured by inspection station 212A, 212B, or 212C. As mentioned previously, the inspection stations 212A-C include a digital camera having a CCD sensor for converting an optical image into an electronic signal. The electronic signal is processed by the digital camera to produce a digital image. The digital image is at least momentarily stored in a computer memory cache in the inspection station 212A, 212B, or 212C.

As discussed previously, a digital image includes a multi-dimensional array of values that correspond to the optical input of the digital camera sensor. For purposes of the following discussion, the digital image is a two-dimensional array of pixel values, each pixel value representing a gray-scale value. A digital image that has been compressed, saved as a different image format, cropped or otherwise altered is referred to herein as the same digital image.

With reference to FIG. 4, the capture of the digital image may be initiated by the state machine 224 of the controller 220. In this example, the state machine 224 is configured to trigger the image capture in response to a signal or message generated by the PLC 211 that indicates a vehicle 218 is present and ready for inspection. In some cases, the image capture is initiated by a signal directly from the PLC 211 or other form of automation control.

Figure 7:
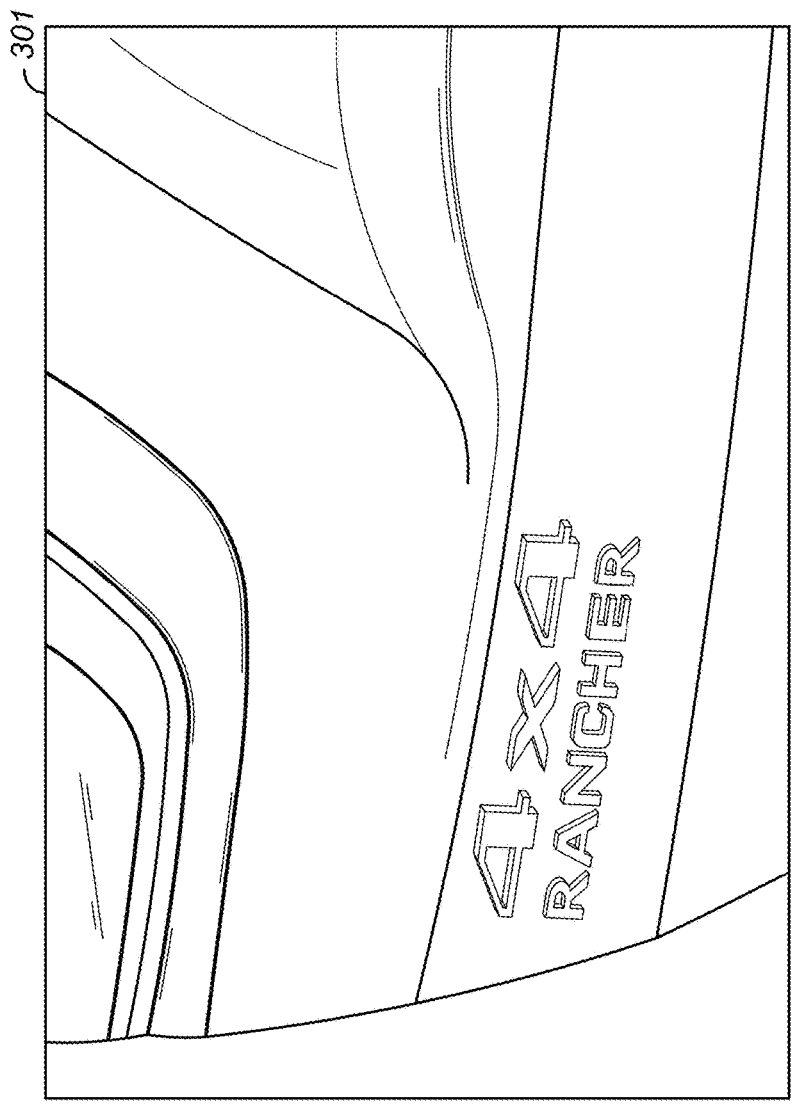
FIG. 7 depicts a digital image captured at an inspection station.

FIG. 7 depicts an exemplary digital image 301 that may be captured by the inspection station 112A-C. FIG. 7 depicts a digital image 301 of the rear gate portion of a vehicle having the left rear gate vehicle badge. As discussed in more detail below, the digital image 301 includes information relevant to the quality analysis of the vehicle including the text of the vehicle badge indicating the model of vehicle and the placement of the vehicle badge with respect to other features on the vehicle.

In operation 1002, the digital image is transmitted to the controller. With respect to the example depicted in FIG. 4, the digital image is transmitted from the inspection station 212A, 212B, or 212C to the controller 220 using data network 251. Operation 1002 may also be initiated by state machine 224 of the controller 220. For example, the state machine 224 may cause the controller 220 to send a request for the digital image stored in the computer memory cache at the inspection station 212A, 212B, or 212C. In some cases, operation 1002 is initiated by the inspection station 212A, 212B, or 212C without additional input or instructions from the controller 220.

The digital image is typically transferred in a standard image file format, including, for example, a standard bitmap, jpeg, or tiff image file format. In some cases, other data is transmitted along with the digital image. For example, data indicating the camera settings, light settings, time, date, and other information related to the state of inspection station may also be transmitted to the controller 220.

In operation 1004, the controller analyzes the digital image and calculates one or more measurements. With respect to FIG. 4, the digital image is analyzed by the vision analyzer 222 of the controller 220. In the present example, vision analyzer 222 implements a series of machine-vision algorithms applied to the digital image using a Vision Query Language (VQL). Initially, one or more image-conditioning machine-vision algorithms may be applied to brighten the image and increase the contrast between light and dark pixels in the digital image. A second set of machine-vision algorithms may then be applied to the digital image to extract one or more features. In this example, a corner detection machine-vision algorithm is applied to identify one or more candidate areas of the digital image that may contain a representation of the vehicle badge. The identified candidate areas are then filtered by the number of corner points detected for each candidate area. A template-matching machine-vision algorithm may then be applied to the digital image to compare the candidate areas to one or more reference images of known vehicle badges.

Figure 8:
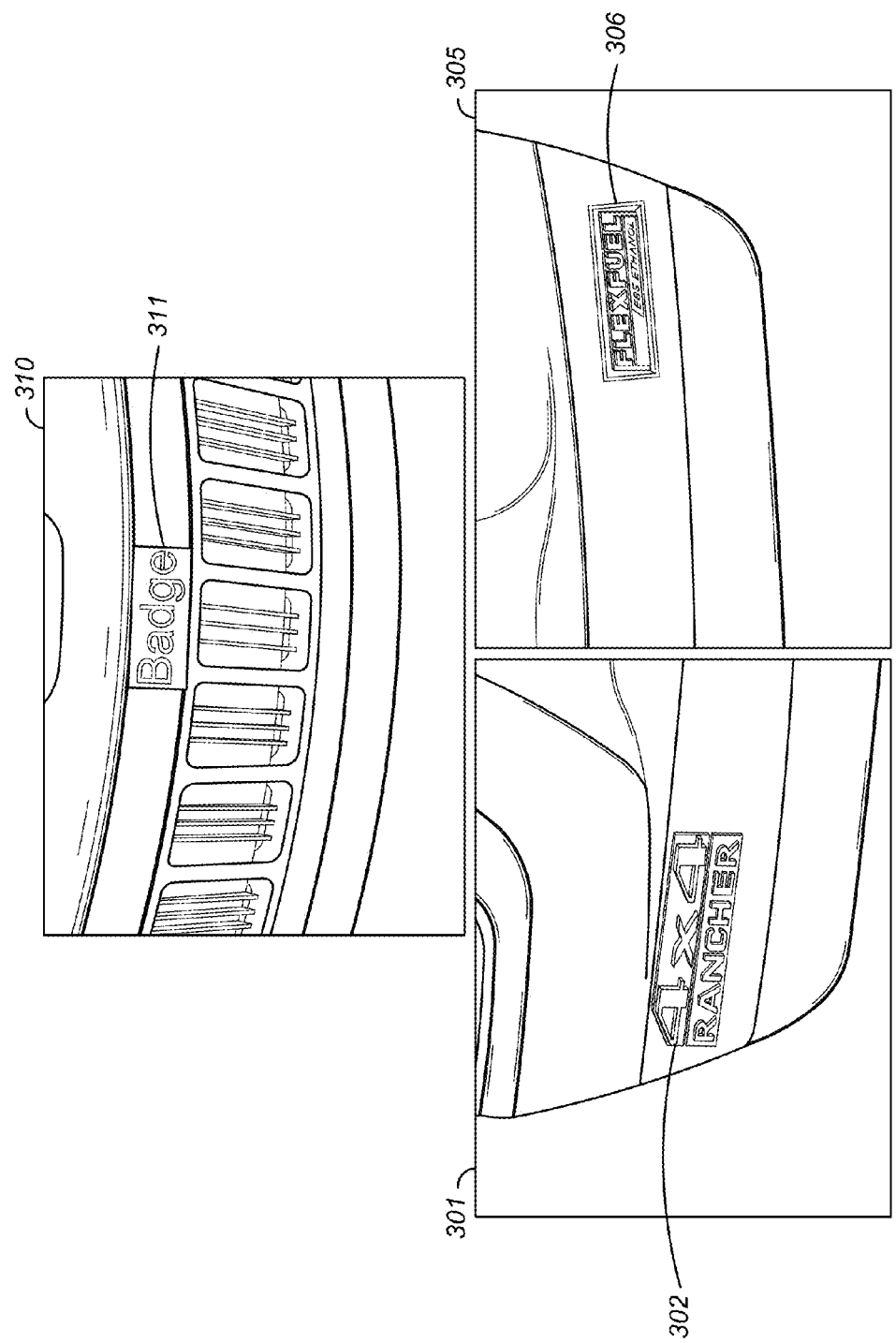
FIG. 8 depicts an analysis of digital images captured at multiple inspection stations.

FIG. 8 depicts an exemplary analysis of multiple captured digital images 301, 305, 310 in accordance with operation 1004. As shown in FIG. 8, the digital images 301, 305, 310 have been analyzed to identify the regions that contain the representation of the vehicle badges. The regions for digital images 301, 305, 310 are indicated in FIG. 8 by the bounding boxes 302, 306, 311. The portion of the digital images located in each of the bounding boxes 302, 306, 311 is further analyzed to recognize the text inside the bounding boxes 302, 306, 311. In some cases, an optical character recognition machine-algorithm is applied, as suggested above. In other cases, another form of shape recognition is performed to identify the type of badge that has been installed on the vehicle.

With regard to operation 1004, one or more measurements are also computed by the vision analyzer 222 of the controller 220. In this example, one measurement may include the relative location of the bounding box 302 with respect to the digital image 301. Another measurement may include the recognized text contained in the bounding box 302. Yet another measurement may include an identification or "match" of the type of badge that is installed on the inspected portion of the vehicle 218 (e.g., "4×4 Rancher").

In some cases, a relative measurement may be calculated based on input from other information in the machine-vision system 200. For example, the placement location of the badge may be compared with a known target value to calculate a deviation value. In another example, the vehicle identification number (VIN) may be transmitted to the controller 220 from the PLC 211. Using the VIN, the controller can collect information about the trim level of the vehicle using, for example, a manufacturing resource planning (MRP) system. The additional information provided by the MRP system may indicate the trim level of the vehicle or type of badge that should be installed. A "pass" measurement may be calculated if, for example, the badge corresponds to the trim level, and a "fail" measurement is calculated if the badge and trim level do not correspond.

In operation 1006, the digital image and the measurement are transmitted. With reference to FIG. 2, the digital image and measurement are transmitted from the controller 220 to the vision server 230 via communication network 252. In some cases, copy of the digital image may be transmitted in the same format as received from the inspection station 212A, 212B, or 212C. In other cases, the digital image may be converted into another format or compressed before being transferred to the vision server 230. As previously mentioned, for the purposes of the machine-vision system 200, compressed, reformatted, cropped, or otherwise altered versions of the original captured image are all referred to generally as the digital image.

As previously mentioned, the digital image and its associated measurements are also referred to as a data frame. Other information may also be transmitted to the vision server 230 as part of the data frame. For example, other information collected by the inspection station 212A, 212B, or 212C may be included in the data frame. Additionally, information from the PLC 211 may also be gathered by the controller 220 and included in the data frame. In some cases, information gathered from the PLC may include ambient temperature, machine calibration data or other data related to the manufacturing conditions of the production line 214. Other data that may be included in the data frame includes, but is not limited to, time, date, location, camera settings, part number, or any other information associated with the inspection of the vehicle 218.

In operation 1008, the digital image and measurement are stored. With reference to FIG. 5, the digital image and associated measurements are stored in the database 236 of the vision server 230. In this example, the entire data frame is stored in the database 236. Non-image data in the data frame may also be used by the database 236 to develop an index for faster retrieval of the image. The data frame may be stored locally on the vision server 230, or may be stored in a network of other server machines 240, as shown in FIG. 5.

In operation 1010, a quality metric is computed. With reference to FIG. 5, the quality metric is computed using an aggregator component 234 of the vision server 230. In this example, the quality metric is computed based on an aggregation of the measurements computed in operation 1006 and previously computed measurements of other previously manufactured products. With regard to the present example, the aggregator component 234 may compute quality metrics using the current and previous placement locations of the badge. Exemplary quality metrics include a mean location, deviation from the mean location, and the like. The quality metrics may also include results generated by statistical processing, such as regression analysis, distribution analysis, or Nelson rules of process control and other control charting techniques.

With regard to operation 1010, additional quality metrics can be computed based on the more comprehensive pass/fail measurements calculated in operation 1006. Exemplary quality metrics include the total number of defects, defect frequency, number of defects by shift, number of defects by type of defect, and defect correlation to other recorded factors. Examples of these quality metrics are depicted in the user interface 450 and discussed below with respect to FIG. 9B.

In operation 1012, the digital image, measurement, and quality metric are transmitted. With reference to FIG. 5, the digital image, measurement, and quality metric are transmitted from the vision server 230 to the remote terminal 240 using data network 253. In this example, the data is transmitted to the remote terminal 240 as web content compiled by the web server 238 on the vision server 230. The web content may be generated and transmitted using a variety of web-based technologies such as HTML, JavaScript, JSON, and/or other techniques for transmitting content to be displayed on an Internet browser.

Figure 9A:
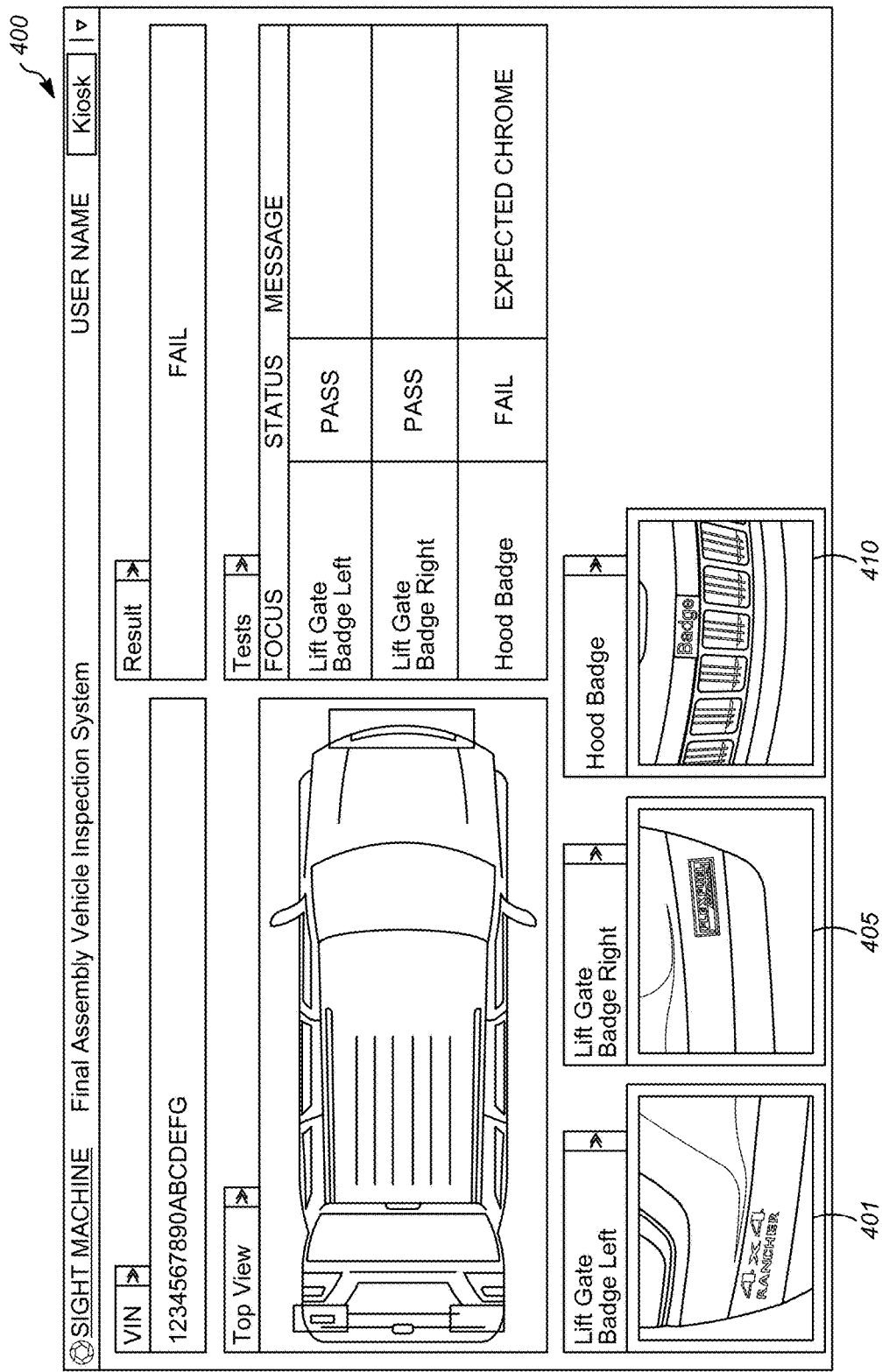
FIGS. 9A-B depict an exemplary user interface for remote quality inspection of a product.
Figure 9B:
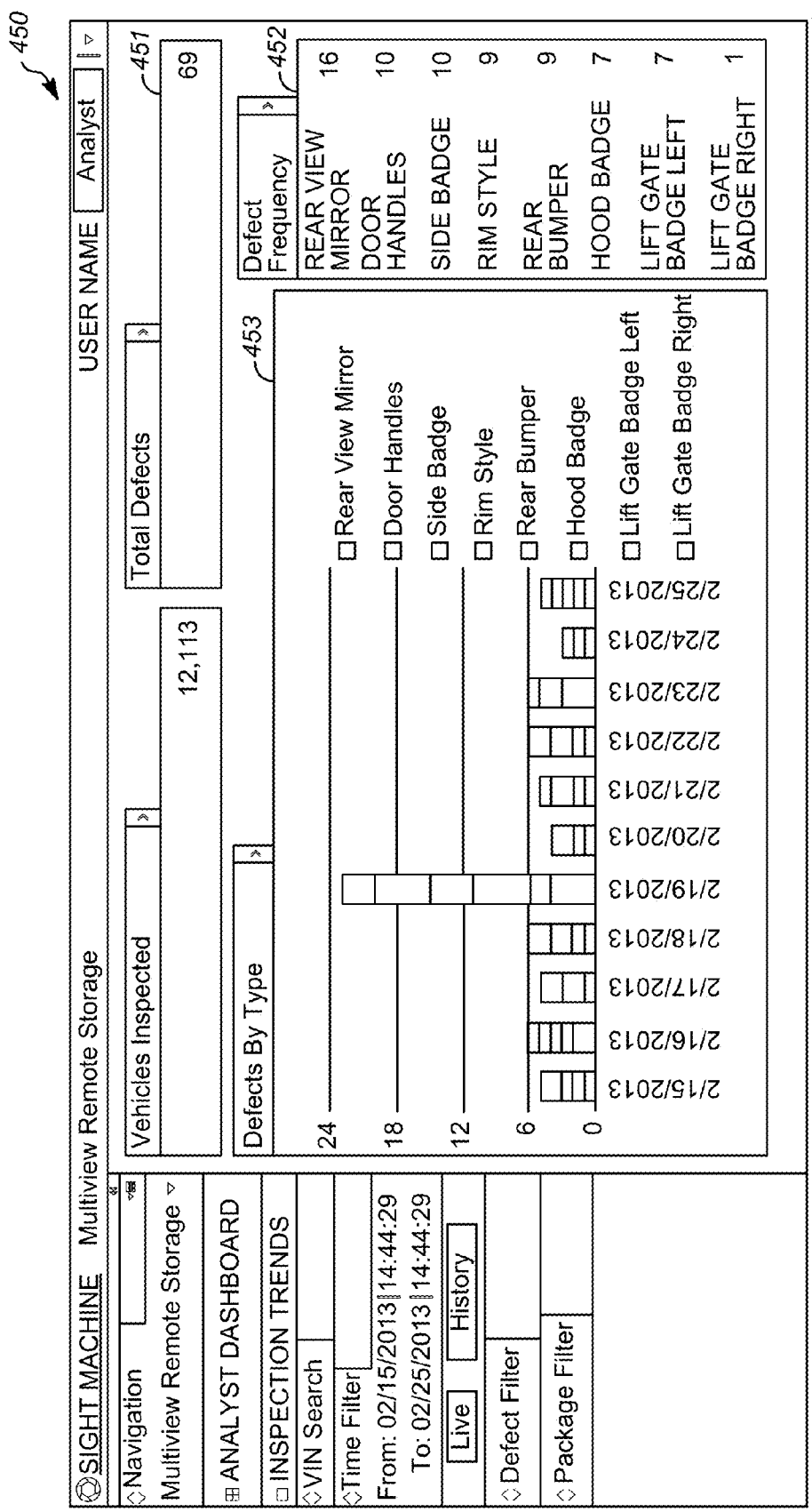

In operation 1014, the digital image, measurement, and quality metric are displayed. With reference again to FIG. 5, the information is displayed on the remote terminal 240 as web content. FIGS. 9A and 9B depict exemplary user interface screens 400, 450 that may be displayed on the remote terminal 240. As shown in FIG. 9A, a user interface screen 400 includes digital image 401 of the left rear gate portion of the vehicle. The user interface screen 400 also includes measurements (pass/fail) for the left rear gate that were calculated in operation 1006, above. As shown in FIG. 9B, quality metrics are depicted, including total number of defects 451, defect frequency 452, and number of defects by type 453.

The process 1000 depicted in FIG. 6A offers multiple advantages over traditional machine-vision systems. For example, using process 1000 updated quality metrics can be displayed on the remote terminal in near real time. That is, in a relatively short period of time, new measurement data is transmitted to the vision server in operation 1006, the data metric is recalculated in operation 1010 and then displayed at the remote terminal in operation 1014. Using process 1000, the operator can monitor inspections nearly simultaneously with their occurrence at multiple inspection stations in the production facility.

FIG. 6B depicts another exemplary process 1100 for monitoring the output of a plurality of inspection systems. The process 1100 is explained with respect to the vehicle badge inspection system as provided in machine-vision system 200 of FIG. 2.

With reference to FIG. 4, a plurality of digital images is captured using digital cameras at a plurality of inspection stations 212A-C. The image acquisition occurs in a similar fashion as described above with respect to process 1000. An example of the multiple digital images that may be captured is depicted in the user-interface screen 400 including digital images 401, 405, and 410.

In operation 1102, the multiple digital images are transmitted to the controller. With reference to FIG. 4, the multiple digital images are transmitted to the controller using data network 251. Operation 1102 may be initiated using the state machine 224 of the controller 220 in a similar fashion as described above with respect to operation 1002.

In operation 1104, the multiple digital images are analyzed and measurements are calculated based on the analysis. The analysis of each of the multiple digital images is performed by implementing one or more machine-vision algorithms, as described above with respect to operation 1004. In general, each digital image is analyzed to calculate one or more measurements. In a typical implementation, the machine-vision algorithms that are applied to each digital image are different in order to optimize the analysis for the measurements that are being calculated and to account for different lighting conditions, camera angles, and other factors.

Furthermore, in operation 1104, a comprehensive measurement may be calculated using the multiple measurements calculated based on input from the plurality of inspection stations (212A, 212B, 212C depicted in FIG. 4). In general, the comprehensive measurement is an indication of the quality of the vehicle 218 based on measurements obtained by two or more of the inspection stations 212A, 212B, or 212C. Specifically, with regard to the current example, the plurality of inspection systems 212A-C capture additional digital images of other portions of the vehicle 218 including the wheels, chrome trim, or other features of the vehicle 218. Based on an analysis of the multiple digital images, the trim level of the vehicle 218 can be determined (e.g., Rancher, Sport, or Special Edition). The controller 220 may then determine if the badge identified in digital image 301 corresponds to the trim level identified using the additional digital images captured using the other inspection stations. A "pass" comprehensive measurement is calculated if the badge corresponds to the trim level, and a "fail" comprehensive measurement is calculated if the badge and trim level do not correspond.

The comprehensive measurements may indicate the type of failure that occurred. For example the controller 220 may compute a comprehensive measurement represented by "fail-no chrome wheels" if the digital images of the badge portions of the vehicle produce measurements that indicate that the trim level should include chrome wheels, and the digital image of the wheels of the vehicle produce measurements that indicate that the wheels are not chrome. In addition, the pass/fail measurements may also be represented by instructive commands indicating the nature of the failure and the corrective action to be taken. For example, a fail measurement may be represented by the text "remove rear badge '4×4 Rancher' and replace with badge '4×4, Sport'."

Yet another type of comprehensive measurement may compute an overall error value based on a composite of multiple measurements from multiple digital images. For example, each inspection station directed to a vehicle badge may produce a badge location measurement. Based on these measurements, a deviation from the target measurement may be computed. In this case, the comprehensive measurement may include an overall error value based on each deviation from the target measurements obtained based on digital images of the vehicle badges.

In operation 1106, the digital images and the measurements are transmitted. With reference to FIG. 2, the digital image and measurement are transmitted from the controller 220 to the vision server 230 via communication network 252. The digital image and measurements associated with a single inspection station may be communicated as a single data frame, as described above with respect to operation 1006. In addition, a comprehensive measurement and the associated multiple images may be communicated as a single data frame to the vision server 230.

In operation 1108, the digital images and the measurements are stored. With reference to FIG. 5, the digital image and associated measurements are stored in the database 236 of the vision server 230. The storage of the digital images and measurements may be performed in a similar fashion as described above with respect to operation 1008.

In operation 1110, the digital image and measurement are transmitted. With reference to FIG. 5, the digital image, measurement, and quality metric are transmitted from the vision server 230 to the remote terminal 240 using data network 253. In this operation, it is not necessary that all of the digital images and all of the associated measurements be transmitted to the remote terminal 220. As described above with respect to operation 1014, the digital image and measurement may be transmitted as web content compiled by the web server 238 on the vision server 230.

In operation 1112, the digital image and quality metric are displayed. With reference again to FIG. 5, the information is displayed on the terminal device 240 as web content. FIGS. 9A and 9B depict exemplary user interface screens 400, 450 that may be displayed on the terminal device 240. As shown in FIG. 9A, a user interface screen 400 includes digital image 401 of the left rear gate portion of the vehicle. The user interface screen 400 also includes comprehensive measurements (pass/fail) for the left rear gate that were calculated in operation 1106, above.

The process 1100 depicted in FIG. 6B offers multiple advantages over traditional machine-vision systems. For example, using process 1100, the system provides systematic storage and archiving of captured digital images and comprehensive measurement data. The large volume of data that can be stored on the database 236 allows the operator to review previous production runs and even perform additional machine-vision analysis on stored digital images to extract new measurements. This functionality may be useful when troubleshooting a product failure mode that may have been passed through the system using the original quality criteria.

FIG. 6C depicts another exemplary process 1200 for dynamically updating a quality metric for a product. The process 1200 is also explained with respect to the vehicle badge inspection system as provided above in machine-vision system 200 of FIG. 2. Process 1200 may be implemented in addition to the processes 1000 and 1100 described above with respect to FIGS. 6A and 6B. That is, either of the processes described above may be combined with process 1200 to dynamically update a quality metric for a product.

For example, the system may be originally configured to monitor the type and placement location of the vehicle badges, as described above with respect to process 1000. After several vehicles have been produced, the user may decide that the material finish of the badges should also be monitored to ensure that they have been chrome plated. Accordingly, the user may designate a new quality criterion that measures the surface finish of vehicle badge materials. In this case, the new quality criterion would require that new machine-vision algorithms are to be performed on the captured digital images.

Using a traditional machine-vision system, a quality engineer or technician may, at best, reconfigure the individual inspection stations to implement the additional machine-vision algorithms. Traditionally, this would require a manual reprogramming of each inspection station, which would require that a human operator be physically located at the production facility to execute an update. This may also require the production line to be stopped during reprogramming, thus causing manufacturing delays. Furthermore, there would be no way to evaluate vehicles that had already been manufactured using the additional machine-vision algorithm because the previously manufactured products have already passed the badge inspection stations and the digital images have been discarded.

However, using process 1200, a quality engineer or technician (exemplary user) may designate a new quality criterion that specifies additional new machine-vision algorithms without interrupting the production line or even being located at the production facility. In addition, the new quality criterion can be applied to previously manufactured vehicles to ensure that they would have passed, or to identify which vehicles would not have passed inspection had the criterion been in place when they were manufactured.

In operation 1202, a quality criterion is obtained. With reference to FIG. 2, a quality criterion may be obtained from the user via the user interface on the remote terminal 240. In a typical implementation, the quality criterion is a new aspect of the product or process that the user would like to monitor. With regard to operation 1202, the user may designate the new quality criterion by checking a box on the user interface or by explicitly specifying the new machine-vision algorithms that are to be performed.

In operation 1204, the new quality criterion is transmitted. With reference to FIG. 2, the quality criterion may be transmitted from the remote terminal 240 to the vision server 230 using the data network 253.

In operation 1206, a secondary machine-vision algorithm is performed based on the new quality criterion to calculate a new measurement. With reference to FIG. 5, the vision analyzer 232 may perform the secondary machine-vision algorithm using new digital images that are received from the controller 240 for vehicles that are currently under production. By performing the new machine-vision algorithm, a new measurement is calculated in accordance with the new quality criterion. In addition, the vision analyzer 232 may perform the secondary machine-vision algorithm on previously stored digital images to obtain new measurements for vehicles that have already been produced.

In some implementations, the new measurements from both the current digital images and the previously stored digital images are aggregated to compute a new quality metric. With reference again to FIG. 5, the aggregator 234 may compute a new quality metric based on the new measurements from both the current and previously stored digital images. In the current example, the aggregator 234 may compute a new quality metric, such as the total number of defects, based on the new measurements.

In operation 1208, the new measurement or new quality metric is transmitted back to the remote terminal and displayed. With reference to FIG. 2, the new measurement may be transmitted from the vision server 230 to the remote terminal 240 using the data network 253. As described above with respect to operations 1012 and 1110, the new measurement or quality metric may be transmitted as web content compiled by the web server 238 on the vision server 230.

3. Remote Control and Maintenance of Controller and Inspection Stations

Figure 10A:
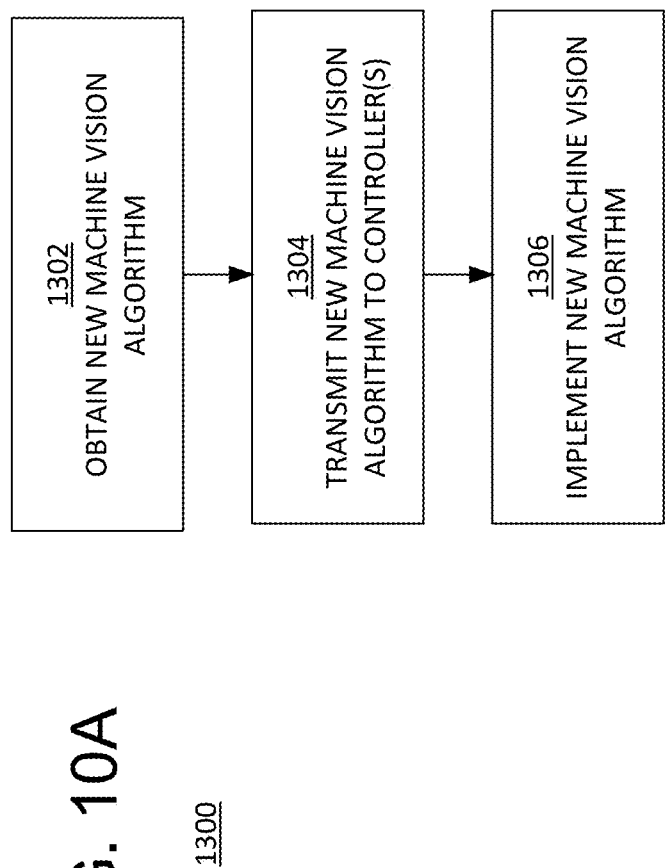

FIGS. 10A-B depict exemplary processes for performing remote control and maintenance of one or more controllers and inspection stations using the machine-vision system 200 depicted in FIG. 2. Specifically, a user at remote terminal 240 can perform software updates and control camera settings without being located at the production facility 210.

FIG. 10A depicts an exemplary process 1300 for remotely updating one or more machine-vision algorithms or installing new machine-vision algorithms on a controller using a remote terminal. With reference to FIG. 2, process 1300 may be implemented, for example, if the machine-vision algorithms currently installed on the controller 220 are outdated or if additional machine-vision algorithms are necessary to compute additional measurements.

In some cases, the software used to implement machine-vision algorithms may evolve quickly and newer algorithms offering improvements in accuracy and efficiency. New algorithms may also provide significant benefits to machine-vision systems in terms of throughput or functionality. However, as previously mentioned, traditional machine-vision implementations do not typically facilitate easy upgrades or changes to the machine-vision algorithms that are running at the various autonomous inspections stations. For example, traditional implementations may require a human operator to perform the installation at each inspection station.

Using process 1300 depicted in FIG. 10A, a remotely located user can easily update one or more controllers with new software. This process enables, for example, a single remote user to update machine-vision software running on multiple controllers within a single plant or at multiple plants. Thus, process 1300 may provide improvements in the efficiency of the maintenance of a machine-vision system as compared to traditional autonomous-cell type machine vision implementations.

In operation 1302, a new or upgraded machine vision algorithm is obtained. With reference to FIG. 2, this process may be initiated by a user at a remote terminal 240. The new or upgraded machine-vision algorithm may be obtained from computer memory based on a user selection at the user interface of the remote terminal 240. For example, the machine-vision algorithm may be stored in computer memory on the vision server 230 and is obtained in response to a user selection on the remote terminal 240. This configuration may be advantageous because the vision server 230 can function as a common storage location for a large library of machine-vision algorithms. Updates can be made to the machine-vision algorithms on the vision server 230 and then pushed to one or more controllers 220, as needed. Additionally or optionally, the machine-vision algorithm may be manually entered or uploaded by the user at the remote terminal 240.

In operation 1304, the new machine-vision algorithm is transmitted to the controller or multiple controllers. With reference to FIG. 2, the machine-vision algorithm may be transmitted from the remote terminal 240 to the controller 220 using any one of many communication paths depending on where the machine-vision algorithm is stored or uploaded. In the case where the machine-vision algorithm is stored on the vision server 230, the algorithm is transferred directly from the vision server 230 to the controller 220 using data network 252. In the case there the machine-vision algorithm is stored, entered, or uploaded at the remote terminal 240, it is transmitted from the remote terminal 240 to the vision server 230 using data network 253. The machine-vision algorithm is then transferred from the vision server 230 to the controller 220 using data network 254.

In operation 1306, the machine-vision algorithm is implemented. With reference to FIG. 4, once the machine-vision algorithm is transmitted to the controller 220, the vision analyzer 222 may be configured to perform the machine-vision algorithm on new images that are received from the one or more inspection stations 212A, 212B, or 212C. In some cases, a revision identification scheme is recorded at the controller 220 to reflect the addition of the machine-vision algorithm.

FIG. 10B depicts an exemplary process 1400 for controlling camera settings using a remote terminal. With reference to FIG. 2, process 1400 may be implemented to change the settings on one or more cameras at inspection stations 212A-C. Camera settings may include, for example, exposure, shutter speed, ISO, frame rate, lighting settings, and the like. In some cases, two or more camera settings are grouped together as a set. These camera settings may need to be updated, for example, in response to changes in lighting conditions, changes in the manufacturing process, or if the current image quality is otherwise unsatisfactory.

In operation 1402, new camera settings are obtained. With reference to FIG. 2, this operation may be initiated by a user providing inputs to a user interface on the remote terminal 240. With regard to operation 1402, the user may designate the new camera settings by, for example, checking boxes on the user interface or by explicitly specifying the new settings to be used. In some cases, the settings may be stored on the vision server 230 and are obtained in response to a user selection on the remote terminal.

In operation 1404, the camera settings are transmitted to the controller. With reference to FIG. 2, the settings may be transmitted from either the remote terminal 240 or the vision server 230 to the controller using the data networks 252, 253.

In operation 1406, the camera settings are implemented at the appropriate inspection station. With reference again to FIG. 2, the controller 230 may communicate the camera settings to one or more of the inspection stations 212A, 212B, or 212C. Once the settings are received by the inspection stations, new images that are acquired will implement the settings. Alternatively, the settings may be stored at the controller 220 and used during the operation of the inspection stations 212A-C. For example, the settings may be implemented as instructions to the inspection stations 212A-C when the controller 220 requests an image capture.

In this manner, a remote user can use process 1400 to adjust the camera settings as needed to ensure that the digital images captured by the cameras are of appropriate quality for the image analysis required.

4. Implementation on a Computer Hardware Platform

Figure 11:
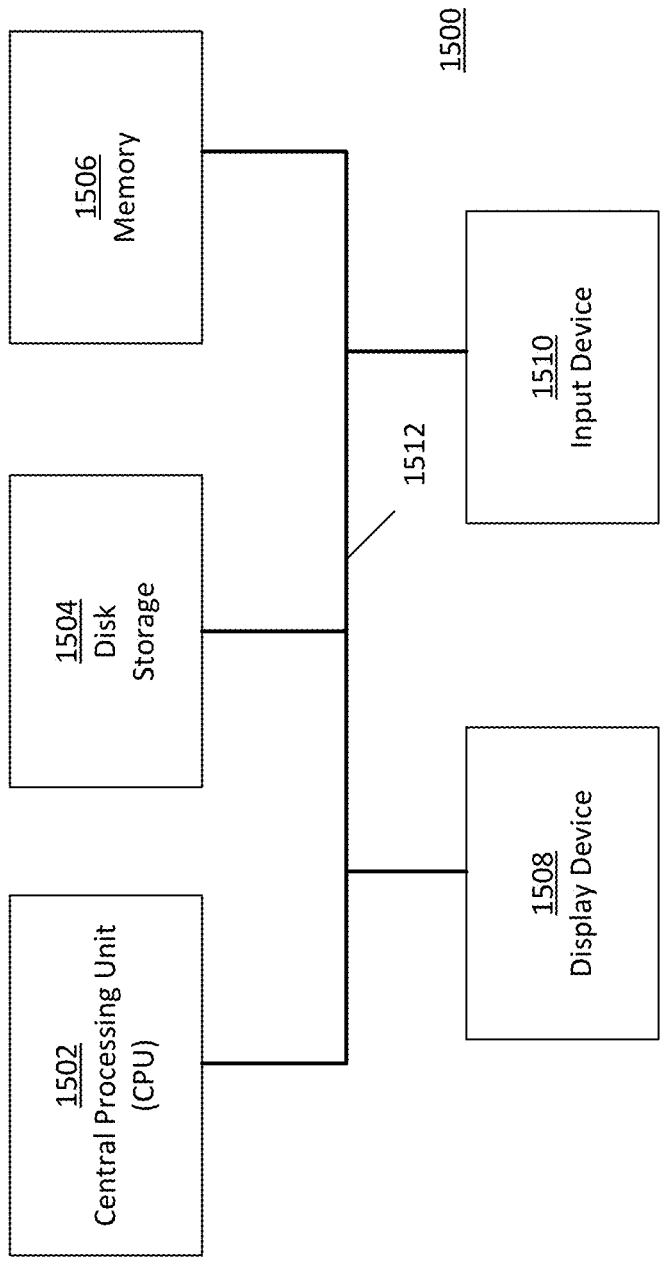
FIG. 11 depicts an exemplary computer hardware platform.

With reference to exemplary machine-vision system 200 depicted in FIG. 2, multiple components of the machine-vision system 200 are implemented using a computer hardware platform. Specifically, the controller 220, the vision server 230, and the remote server 240 are each implemented in this example as specially configured computer hardware platforms. While each of these components may be optimized for the functions required by the machine-vision system 200, there are elements that each of these components have in common. FIG. 11 depicts the elements that are common among computer hardware platforms used in the embodiments discussed herein.

FIG. 11 depicts a computer system 1500 with several standard components that may be used to perform certain aspects of the functionality associated with the machine vision system. Specifically, the computer system 1500 includes a central processing unit (CPU) 1502 to execute computer-readable instructions; non-transitory computer memory 1506 to store computer-readable instructions, and disk storage 1504 for storing data and computer-readable instructions; a display device 1508 for displaying system outputs; and an input device 1510 for receiving input from a user. The CPU, memory, disk, display, and input units are connected by one or more bidirectional buses 1512 that transmit data and/or computer-readable instructions between the units.

The computer system 1500 of FIG. 11 may be used, for example, to implement the vision server 230 of FIG. 2. In this case, the disk storage unit 1504 may be used to archive digital images received from one or more controllers 220 along with storing the aggregated quality metrics. The CPU 1502 may be used to calculate quality metrics, and to implement machine-vision algorithms on archived digital images and digital images that are being received from one or more controllers 220. The memory unit 1506 may be used to store machine-vision algorithms, computational results, queries, or other types of data or computer-readable instructions.

The computer system 1500 of FIG. 11 may also be used to implement the controller 220 of FIG. 2. In this case, the CPU 1502 may be used to implement machine-vision algorithms on the image data collected from the inspection stations 212A-C to obtain measurements. The CPU 1502 may also execute the state machine logic used by state machine 224 to interface with the inspections stations 212A-C and/or the PLC 211 of the automation system. The memory unit 1506 may be used to store machine-vision algorithms, computational results, vision analysis queries, or other types of data or computer-readable instructions.

The computer system 1500 of FIG. 11 may also be used to implement the remote terminal 240 of FIG. 2. In this case, the CPU 1502 may be used to execute the user interface that is displayed on the display device 1508. The display device 1508 may display the results of the machine-vision analysis, quality metrics, system status, or other types of information related to the machine-vision system. The input device 1510 may enable the user to enter new queries to the vision server, or to remotely update the controller software or camera settings. The memory unit 1506 or disk storage unit 1504 may be used to store user interface software or new machine-vision algorithms.

5. Further Exemplary Use of a Machine-Vision System, Forged Bolt Inspection

The machine-vision system 200 depicted in FIG. 2 may be adapted to inspect different aspects of different products using different types of imaging hardware. In the example provided below, steel bolts are manufactured using a steel-forging process that compresses a steel blank into a bolt shape. The forging process produces a stronger bolt, but may also lead to premature failure if the internal stresses are too great. In the example below, the cross-section of a forged bolt is inspected using a machine-vision system to determine a quality metric.

Figure 12A:
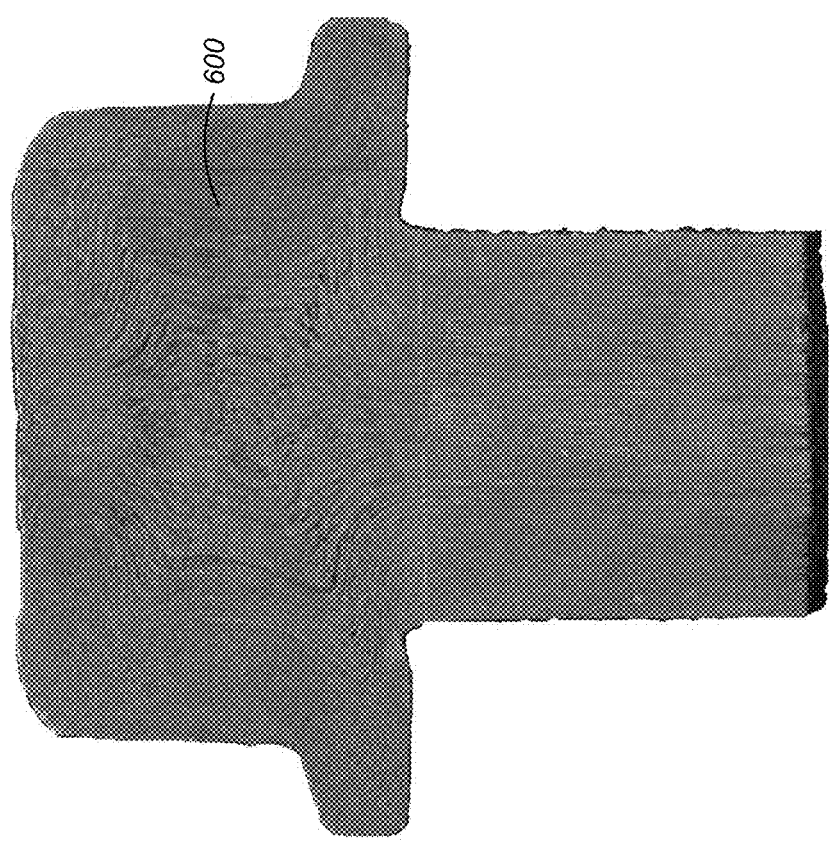
FIG. 12A depicts an exemplary digital image captured at an inspection station.

FIG. 12A depicts a digital image 600 of a forged bolt captured using imaging hardware. In this example, the imaging hardware is a flat-bed digital scanner, which is well suited for producing a high resolution digital image of a relatively small area with features that are difficult to detect. As shown in FIG. 12A, the forged bolt develops whorl patterns in the steel material as a result of the stress caused by the compression of the steel during the forging process. If the whorl patterns are too close to the edge of the part, the forged bolt may fail prematurely.

Using a system similar to machine-vision system 200 depicted in FIG. 2, the digital image 600 captured by the flat-bed digital scanner can be transmitted to a controller for machine-vision analysis. First, the image conditioning machine-vision algorithms are applied to the digital image to enhance the brightness and contrast of the digital image. Then, a series of machine-vision algorithms are applied to the digital image 600 to calculate a characteristic measurement 951 of the internal whorl patterns. In this example, a machine-vision algorithm is applied that identifies the whorl pattern geometry within the bolt material. An additional machine-vision algorithm is applied to the identified geometry to identify portions of the whorl having a characteristic shape. In this case, the characteristic measurement 951 is the effective width between portions of the whorls having the characteristic shape. One or more edge detection machine-vision algorithms may also be applied to the digital image 600 to determine the edges of the bolt 952.

FIG. 12B depicts an image of the bold with the characteristic measurement 951 and various key measurements 952 of the bolt shape. The measurements include, for example, the radius of the curved portion of the bolt where the shank connects to the head, the width of the bolt, and others measurements.

The calculated measurements may then be used to calculate a quality metric. In this example, the quality metric is related to the difference between the characteristic measurement 951 of the whorls and key dimensions 952 of the bolt. If the difference is less than established quality criteria, the bolt may fail the inspection.

When implemented in a system similar to machine-vision system 200 of FIG. 2, the machine-vision analysis can be used to compute another quality metric based on an aggregation of the measurements calculated from the current part with measurements from parts that have been previously manufactured. Additionally, the digital image, measurements, and the quality metrics can be transmitted to a vision server for storage in a database. Selected information may also be transmitted via the vision server to a remote terminal for display to the user.

6. Further Exemplary Use of a Machine-Vision System, Fish Tank Monitor

The machine-vision system can also be used to monitor processes in near real time. Based on metrics calculated using the machine-vision system, the process may be monitored over time using a user interface at the remote terminal.

Figure 13:
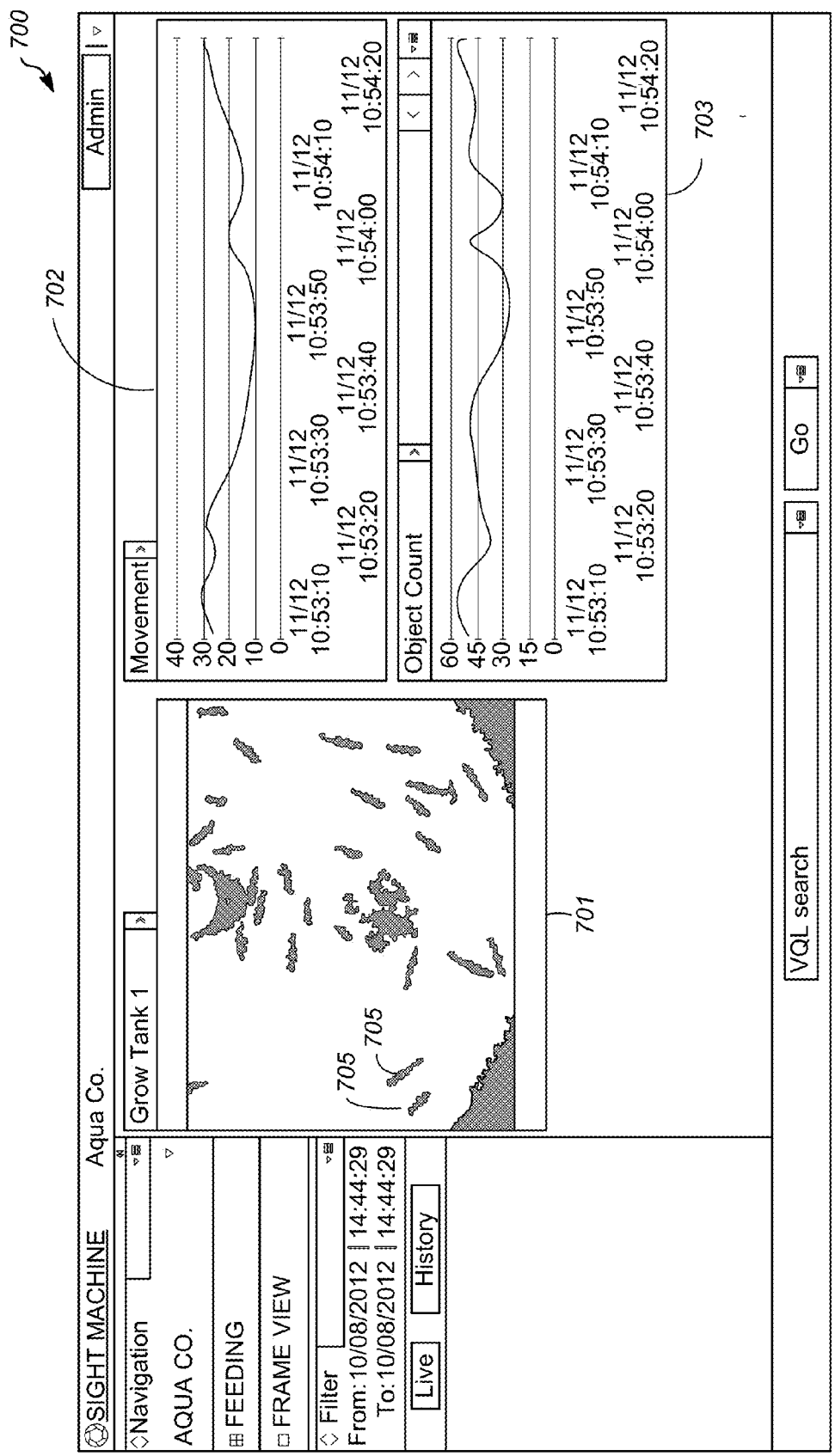
FIG. 13 depicts an exemplary user interface for remote monitoring using a machine-vision system.

FIG. 13 depicts an exemplary user-interface screen depicting images a fish-feeding process being remotely monitored and controlled. Using a machine-vision system similar to the machine-vision system 200 depicted in FIG. 2, a series of digital images of fish in a tank can be captured using a digital camera. Individual fish appear as groupings of dark pixels 705 in digital image 701. The series of digital images are recorded at a set time increment similar to a digital video recording except that the time increment does not have to be as small as typically used in video captured for human viewing purposes. The each of the digital images is transmitted from the camera to a controller, which performs a series of machine-vision algorithms on each captured images. In this case, the controller implements a blob detection machine-vision algorithm on each of the digital images in the set. The controller computes, for example, the number of blobs in the image (fish in the tank) and the centroid of the blobs (location of the fish) as exemplary measurements.

Each image and associated measurements are then transmitted to a vision server as a data frame. The aggregator of the vision server then computes a set of quality metrics based on the number of blobs and changes in location of the detected blobs (representing the movement of the fish in the tank). An exemplary quality metric may represent, for example, the amount of motion of each fish. Another exemplary quality metric represents the aggregate of the overall level of motion in the fish tank. FIG. 13 depicts an exemplary user interface screen 700, which includes a digital image of the fish tank 701 and the quality metric 702 (movement of the fish) computed by the aggregator and displayed as a function of time. Measurements computed by the controller, such as the number of blobs 703, may also be displayed on the user interface. As new images of the fish tank are captured, the visualizations of the respective quality metrics and measurements are updated on the user interface screen 700.

The quality metrics may be used to control a feeding process. In this example, the overall level of motion indicates whether the fish are hungry. Hungry fish move faster and they also move faster during feeding. Using the machine-vision system a signal may be sent from the remote terminal (or controller) to a device located at the tank to automatically feed the fish when the overall level of motion exceeds a threshold value.

The previous descriptions are presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

What is claimed is:

1. A machine-vision system for monitoring a quality metric for a product, the system comprising:
    a controller connected to an image acquisition device over a first data network, wherein the controller and the image acquisition device are located at a production facility, and wherein the controller is configured to:
        receive a digital image from the image acquisition device over the first data network, wherein the digital image represents at least a portion of the product;
        analyze the digital image using a first machine-vision algorithm to compute a measurement of the product; and
        transmit the digital image and the measurement over a second data network;
    a vision server connected to the controller over the second network, wherein the vision server is located external to the production facility, and wherein the vision server is configured to:
        receive the digital image and the measurement from the controller over the second data network;
        compute the quality metric based on statistical analysis of an aggregation of the received measurement and previously computed measurements of other previously captured images, the quality metric correlating a detected defect with data in the aggregation of the received measurement and previously computed measurements; and
        store the digital image and the measurement in a database storage; and
    a remote terminal connected to the vision server over the second data network, wherein the remote terminal is configured to:
        receive the digital image and the quality metric from the vision server over the second data network; and
        display the digital image and the quality metric on the remote terminal.

2. The machine-vision system of claim 1,
    wherein the remote terminal is further configured to:
        receive a request for a new quality criteria from a user at the remote terminal; and
        display a second measurement that corresponds to the new quality metric on the remote terminal;
    wherein the vision server is further configured to:
        analyze the received digital image using a second machine-vision algorithm to compute the second measurement of the product; and
        transmit the second measurement to the remote terminal for display.

3. The machine-vision system of claim 2, wherein the vision server is further configured to:
    retrieve a plurality of previously stored digital images from the database in response to the request for the new quality criteria received at the remote terminal;
    analyze the plurality of previously stored digital images using the second machine-vision algorithm to compute a plurality of second measurements corresponding to the plurality of previously stored digital images;
    compute a second quality metric based on an aggregation of the plurality of second measurements and the second measurement based on the received digital image; and
    transmit the second quality metric to the remote terminal for display.

4. The machine-vision system of claim 1, wherein the image acquisition device is a digital camera having a two-dimensional optical sensor array.

5. The machine-vision system of claim 1, wherein the vision server is further configured to compile the digital image and the quality metric as web content and transmit the web content to the remote terminal for display using an Internet browser.

6. The machine-vision system of claim 1, wherein the remote terminal is further configured to:
    display a graphical representation depicting the quality metric, wherein the graphical representation is updated in response to the vision server receiving a subsequent digital image and subsequent measurement of a subsequent product.

7. The machine-vision system of claim 1, wherein the controller is configured to control the operations of a plurality of inspection stations, each inspection station having an image acquisition device.

8. The machine-vision system of claim 7, wherein the controller is configured to:
    receive signals from an automation controller indicating that the product is present; and
    transmit an instruction to at least one inspection system of the plurality of inspection systems to capture the digital image.

9. The machine-vision system of claim 1, wherein the remote terminal is further configured to receive a request for an updated machine-vision algorithm from a user;
    wherein the vision server is further configured to receive the request from the remote terminal and transmit the updated machine-vision algorithm to the controller; and
    wherein the controller is further configured to analyze the received digital image using the updated machine-vision algorithm.

10. The machine-vision system of claim 1, wherein the remote terminal is further configured to receive a request for an image acquisition setting from a user;

wherein the vision server is further configured to receive the request from the remote terminal and transmit the image acquisition setting to the controller; and wherein the controller is further configured to implement the image acquisition setting on the image acquisition device.

11. A computer-implemented method for monitoring a quality metric for a product, the method comprising:

transmitting a digital image from an image acquisition device to a controller over a first data network, wherein the controller and the image acquisition device are located at a production facility, and wherein the digital image represents at least a portion of the product;

analyzing the digital image at the controller using a first machine-vision algorithm to compute a measurement of the product;

transmitting the digital image and the measurement over a second data network from the controller to a vision server, wherein the vision server is located external to the production facility;

storing the digital image and the measurement in a database storage at the vision server;

computing, at the vision server, the quality metric based on statistical analysis of an aggregation of the received measurement and previously computed measurements of other previously captured images, the quality metric correlating a detected defect with data in the aggregation of the received measurement and previously computed measurements; and transmitting the digital image and the quality metric from the vision server to a remote terminal over the second data network; and displaying the digital image and the quality metric on the remote terminal.

12. A non-transitory computer-readable storage medium including computer-readable instructions that when executed on a computer processor cause the computer processor to perform machine-vision analysis on a digital image of a product, the instructions comprising:

analyzing the digital image at a controller using a first machine-vision algorithm to compute a measurement of the product;

wherein the digital image was transmitted from an image acquisition device to a controller over a first data network, wherein the controller and the image acquisition device are located at a production facility, and wherein the digital image represents at least a portion of the product;

transmitting the digital image and the measurement over a second data network from the controller to a vision server, wherein the vision server is located external to the production facility;

wherein the digital image and the measurement are stored in a database storage at the vision server, wherein a quality metric is computed at the vision server based on statistical analysis of an aggregation of the received measurement and previously computed measurements of other previously captured images, the quality metric correlating a detected defect with data in the aggregation of the received measurement and previously computed measurements, wherein the digital image and the quality metric are transmitted from the vision server to a remote terminal over the second data network and displayed on the remote terminal.

13. A non-transitory computer-readable storage medium including computer-readable instructions that when executed on a computer processor cause the computer processor to compute a quality metric for a product, the instructions comprising:

transmitting a digital image and a measurement over a second data network from a controller to a vision server;

wherein the digital image was transmitted from an image acquisition device to the controller over a first data network wherein the controller and the image acquisition device are located at a production facility, wherein the digital image represents at least a portion of the product, wherein the digital image was analyzed at the controller using a first machine-vision algorithm to compute a measurement of the product;

storing the digital image and the measurement in a database storage at the vision server, wherein the vision server is located external to the production facility;

computing, at the vision server, the quality metric based on statistical analysis of an aggregation of the received measurement and previously computed measurements of other previously captured images, the quality metric correlating a detected defect with data in the aggregation of the received measurement and previously computed measurements; and transmitting the digital image and the quality metric from the vision server to a remote terminal over the second data network, wherein the digital image and the quality metric are displayed on the remote terminal.

14. The machine-vision system of claim 1, wherein the first data network utilizes a first communication protocol, and wherein the second data network utilizes a second communication protocol, and wherein the first and second communication protocols are different types of communication protocols.

15. The machine-vision system of claim 14, wherein the first communication protocol is an industrial protocol or a dedicated conduit communication, and wherein the second communication protocol is an Internet communication protocol.

* * * * *